(12) United States Patent
Kang et al.

(10) Patent No.: US 7,467,358 B2
(45) Date of Patent: Dec. 16, 2008

(54) ASYNCHRONOUS SWITCH BASED ON BUTTERFLY FAT-TREE FOR NETWORK ON CHIP APPLICATION

(75) Inventors: Min-Chang Kang, Gwangju (KR);
Eun-Gu Jung, Gwangju (KR);
Dong-Soo Har, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 760 days.

(21) Appl. No.: 11/023,087

(22) Filed: Dec. 27, 2004

(65) Prior Publication Data

US 2005/0271054 A1 Dec. 8, 2005

(30) Foreign Application Priority Data

Jun. 3, 2004 (KR) .................. 10-2004-0040205
Aug. 30, 2004 (KR) .................. 10-2004-0068370

(51) Int. Cl.
*G06F 17/50* (2006.01)
*G06F 9/45* (2006.01)
*H04L 12/56* (2006.01)

(52) U.S. Cl. .................. 716/1; 716/6; 370/389
(58) Field of Classification Search .................. 716/1, 716/6; 370/389
See application file for complete search history.

(56) References Cited

U.S. PATENT DOCUMENTS

2004/0042493 A1* 3/2004 Emmot .................. 370/474
2005/0251599 A1* 11/2005 Hum et al. .................. 710/100
2005/0251612 A1* 11/2005 Creta et al. .................. 710/316
2005/0259696 A1* 11/2005 Steinman et al. .................. 370/535
2005/0262368 A1* 11/2005 Cherukuri et al. .................. 713/324

\* cited by examiner

*Primary Examiner*—Thuan Do
*Assistant Examiner*—Magid Y Dimyan
(74) *Attorney, Agent, or Firm*—Ladas & Parry LLP

(57) ABSTRACT

The present invention disclosed herein is an asynchronous switch for an network on chip application making possible between IP (Intellectual Property) communication among various IPs in the network on chip. The asynchronous switch according to the present invention in which comprises a data input unit for receiving and storing a plurality of data flits, and confirming whether a kind of each data flit is a header flit or a payload flit according to a transmission request signal; an output port arbitration unit for outputting an output port selection signal showing a output priority of the data by receiving a header flit request signal, final payload flit process request signal, routing information of the header flit, and the a arbitration request signal from the data input unit; and a data output unit for receiving a header storage request signal and a payload storage request signal from the data input unit, temporarily storing the data flit inputted from the data transmission path setting unit, transferring header and payload storage completion signals indicating that the data flit is stored to the data input unit, and outputting the temporarily stored data flit to a designated port according to a pre-set order.

25 Claims, 34 Drawing Sheets

FIG. 4A

| TYPE<br>(22-21) | SOURCE ADDRESS<br>(20-15) | ROUTING INFORMATION<br>(14-0) |
|---|---|---|

FIG. 4B

| TYPE (22-21) | PAYLOAD (20-0) |

# ASYNCHRONOUS SWITCH BASED ON BUTTERFLY FAT-TREE FOR NETWORK ON CHIP APPLICATION

CROSS-REFERENCE TO RELATED APPLICATIONS

The present application claims priority to Korean patent application number 10-2004-0040205 filed on, Jun. 3, 2004 and Korean patent application number 10-2004-0068270 filed on Aug., 30, 2004 which are incorporated herein by reference in their entirety.

BACKGROUND

In order to catch up with a fast increasing multimedia function, system on chip SoC technique in which millions of gates are embodied on one chip is necessary. The SoC is a semiconductor integration circuit in which main functions of the system are integrated on one chip. The SoC includes all hardware and software functions needed for a system, such as a memory, a processor, an external interface, analog and hybrid mode block, built-in software, an OS and so forth.

The SoC has an interconnection structure in which all components share one bus for intercommunication. However, there is a disadvantage of slow communication speed between the components. In addition, since signals are transferred to not only designated component but all components, high power consumption problem arises. Moreover, although 8 to 10 components are mounted on one chip currently, a structure of a chip should be extended enough to employ about 50 to 100 components in the near future. In this case, the more the number of connected components are, the more a load is. As a result, a transmission speed between components becomes slow. Resultantly, it is impossible to unlimitedly increase the number of the component included in one chip using a bus structure.

Like this, the bus structure has been adopted for an interconnection between the components in the present SoC. However, there are many problems such as non-scalability, long arbitration delay, and limited bandwidth, leading to the bottleneck phenomenon. In addition, since a plurality of bus masters compete to obtain a control capacity of the bus, a data transmission delay is increased as the number of the bus master is increased. Because the performance of the bus is determined by the IP, the performance of bus is cannot be used maximally. Also, a switching using the present bus structure is embodied in a synchronous system, so that a clock is necessary and other problems arise therefrom.

In the meanwhile, a network on chip has been investigated in order to solve above-mentioned system on chip structure and support smooth communication between a large number of IPs in one chip. If the network on chip is applied, it is expected to be possible to solve several problems such as limitation of scalability, long arbitration delay, power consumption and so forth. However, still many investigations are requested to do so.

SUMMARY OF THE INVENTION

The present invention is related to asynchronous switches, and more particularly, an asynchronous switch based on a butterfly fat-tree for a network on chip application making possible between IPs (Intellectual Properties) communication through various IPs in the network on chip.

One aspect of the present invention is to provide an asynchronous switch for network on chip applications to transfer a plurality of data packets, wherein the data packet is constructed with one header flit and at least one payload flit, the asynchronous switch comprising: a data input unit for receiving and storing a plurality of data flits, and for confirming whether the data flit is a header or a payload according to a transmission request signal; an output port arbitration unit for outputting an output port selection signal showing a priority of the data on receiving a header flit process request signal, final payload flit process request signal, routing information of the header flit, and a arbitration request signal from the data input unit; a data transmission path setting unit for sequentially storing the data flit according to a priority of an data output determined in the output port arbitration unit; and a data output unit for receiving a header storage request signal and payload storage request signal from the data input unit, temporarily storing the data flit inputted from the data transmission path setting unit, transferring header and payload storage completion signals, indicating that the data flit is stored, to the data input unit, and outputting the temporarily stored data flit to a designated port according to a pre-set order.

Since the switch circuit of the present invention is embodied with asynchronous method, it does not use a clock but uses a 4-stage bundled data protocol which is one of handshake protocols. In addition, a worm hole switching technique is employed in order to maximize a performance of the switch, and a control logic circuit is simplified using an output buffering. The handshake protocol is a message sequence exchanged between two or more devices for synchronization in transmitting and receiving data. In addition, the handshake protocol confirms whether the other device prepares to receive data or not. The 4-stage bundled data protocol means that this sequence is comprised of a plurality of data. Moreover, a worm hole switching means that when one data packet is transferred divided into a plurality of flits, it does not allow another data packet to be transferred through the same data transmission path by occupying a data transmission path during a transmission of the first flit to the final flit.

Additionally, the present invention adopts a butterfly fat-free as a topology of the switch circuit and is capable of transmitting/receiving a variable length flit by providing a flit format suitable for this topology. The butterfly fat-free is useful to large scale communication network and has an excellent characteristic such as area/volume universality.

BRIEF DESCRIPTION OF THE DRAWINGS

FIGS. 4A and 4B illustrate a data format applied to the present invention.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the invention to those skilled in the art. Like numerals refer to like elements throughout the specification.

Hereinafter, it will be described about an exemplary embodiment of the present invention in conjunction with the accompanying drawings.

Figure 1:
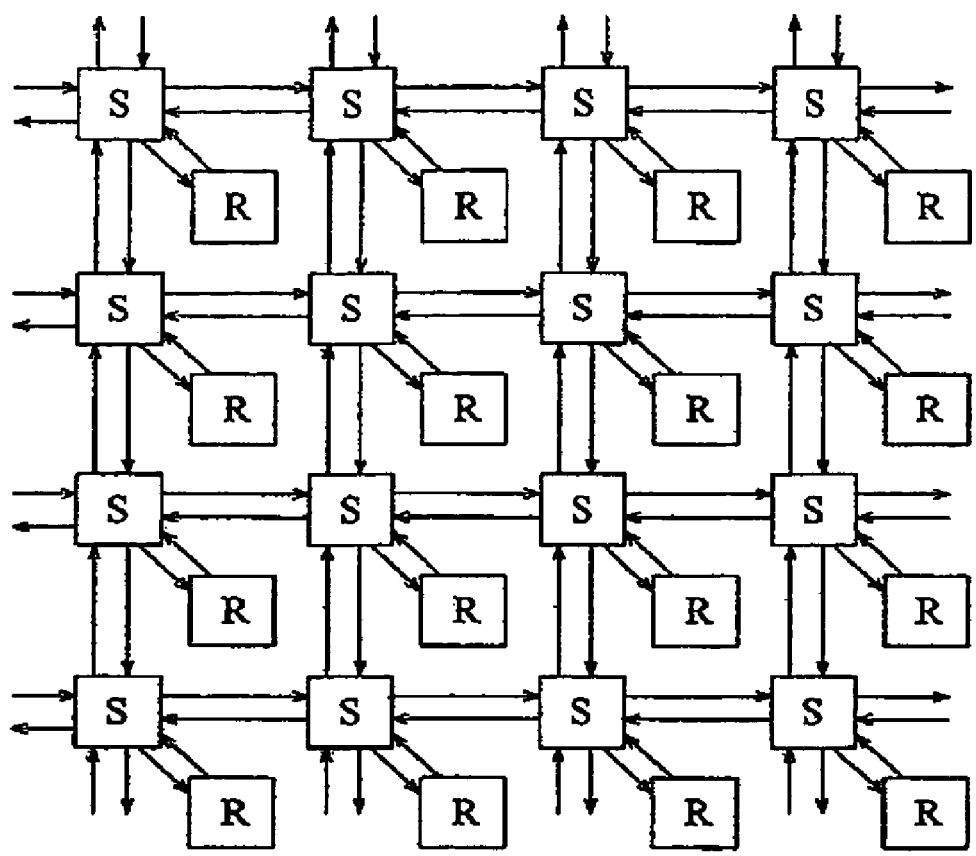
FIG. 1 illustrates an example of a conventional network on chip structure.

As shown in FIG. 1, one IP (R) is connected to one switch S. In this network on chip structure, one switch S should have five input/output ports and performs a function of transferring a packet inputted by a decided routing algorithm into a destination. In this case, since traffic becomes lager along with approach to the center of the network, a high speed switch is requested. In addition, the larger the traffic is, the longer the length of an input/output queue of the switch becomes. As a result, a switch buffer located on the center of the network should be designed in a large scale.

Figure 2:
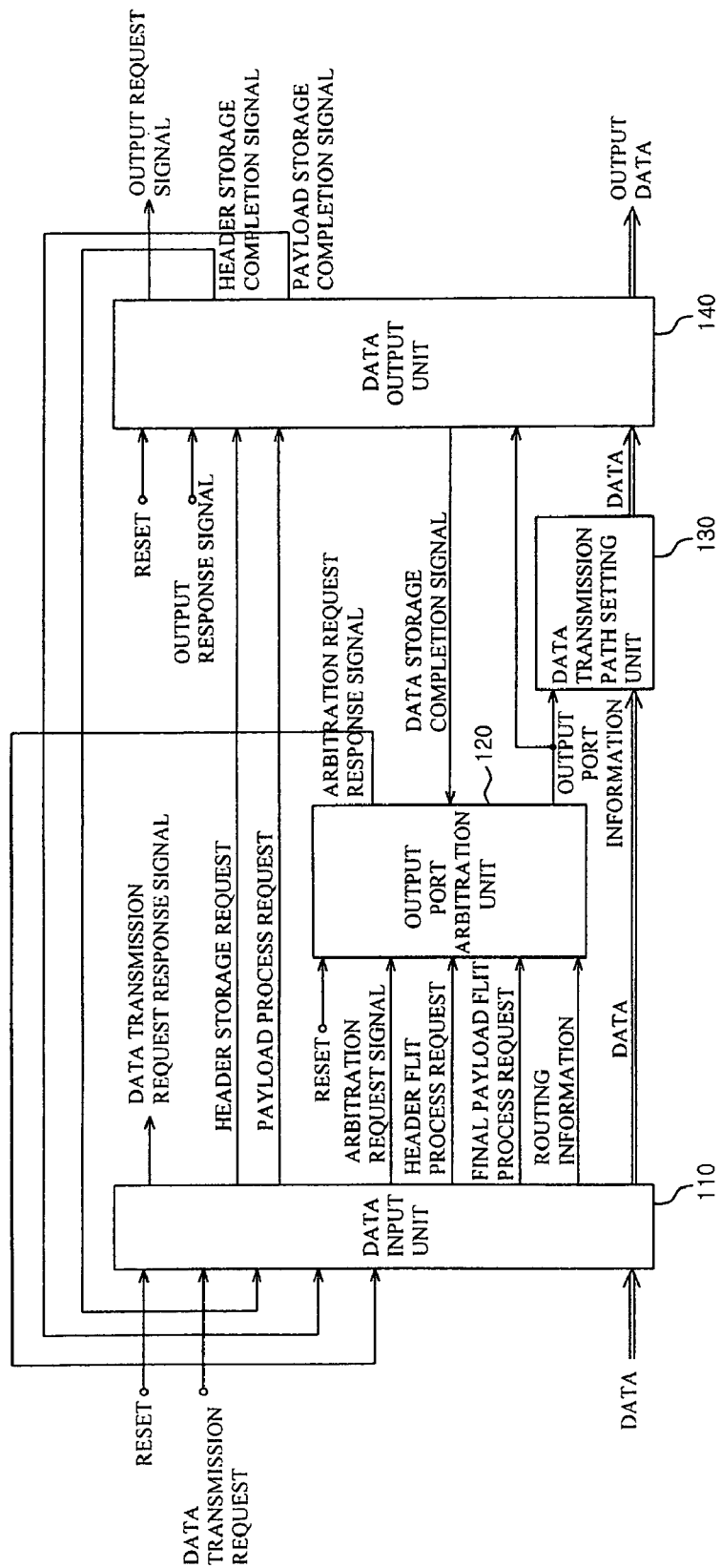
FIG. 2 is a conception diagram of an asynchronous switch according to the present invention.

FIG. 2 is a conception diagram of an asynchronous switch according to the present invention.

As shown in FIG. 2, the asynchronous switch for the network on chip application according to the present invention comprises a data input unit 110 for receiving a reset signal, a control signal, and a plurality of data to temporarily store them; an output port arbitration unit in which a reset signal is inputted and which determines a priority of output data when a plurality of data is simultaneously inputted through the data input unit 110 to be output to be the same output port; a data transmission path setting unit 130 for transferring data according to a data output order that is determined in the output port arbitration unit 120; and a data output unit 140 for outputting data inputted from the data transmission path setting unit 130 according to the reset signal and control signal to a designated port.

More concretely, the data input unit 110 confirms whether data is a header or a payload according to a predetermined data format when data is inputted, and then performs a decoding according to the result. After that, the data input unit 110 requires processing data according to the header or payload to the data output unit 140.

The output port arbitration unit 120 receives an arbitration request signal, a header flit process request signal, final payload storage completion signal and routing information from the data input unit 110 and selects one of data to be simultaneously outputted to the same output port. After that, the output port arbitration unit 120 transfers the result to the data input unit 110 (a arbitration signal request response signal). In addition, the output port arbitration unit 120 transfers output port information selected according to data type to the data transmission path setting unit 130 in order to exactly transfer data through the data transmission path setting unit 130 to the data output unit 140.

The data output unit 140 receives a data process request signal from the data input unit 110 (a header process request signal and a payload storage completion signal) and receives output port information from the output port arbitration unit 120 to temporarily store it. After that, the data output unit 140 outputs the inputted data via the data transmission path setting unit 130 to a designated port. After storing data temporarily, the data output unit 140 transfers the data storage completion signal to the output port arbitration unit 120 to inform that data is stored completely. After outputting data to the designated port, the data output unit 140 informs this to the data input unit 110 (the header process response signal and a payload process response signal). As a result, data input unit is capable of deleting pre-stored data to process next data.

Furthermore, the data input unit 110 transfers a signal (an input request response signal), informing that input data has been processed, to the other switch requiring data transmission or the IP. The data output unit 140 outputs data to pertinent output port and then outputs an output request signal to next stage switch. As a result, data is outputted in next stage switch by the above-mentioned process. A data input unit of next stage switch transfers a response signal (an output response signal) in response to the output request signal to the data output unit 140.

This switch can be embodied by a 6*6 butterfly fat-tree structure having six input ports and six output ports. The data packet is comprised of a plurality of flits. One flit can be constructed with 23-bits. In addition, input/output ports are constructed with four lower ports and two upper ports.

Figure 3:
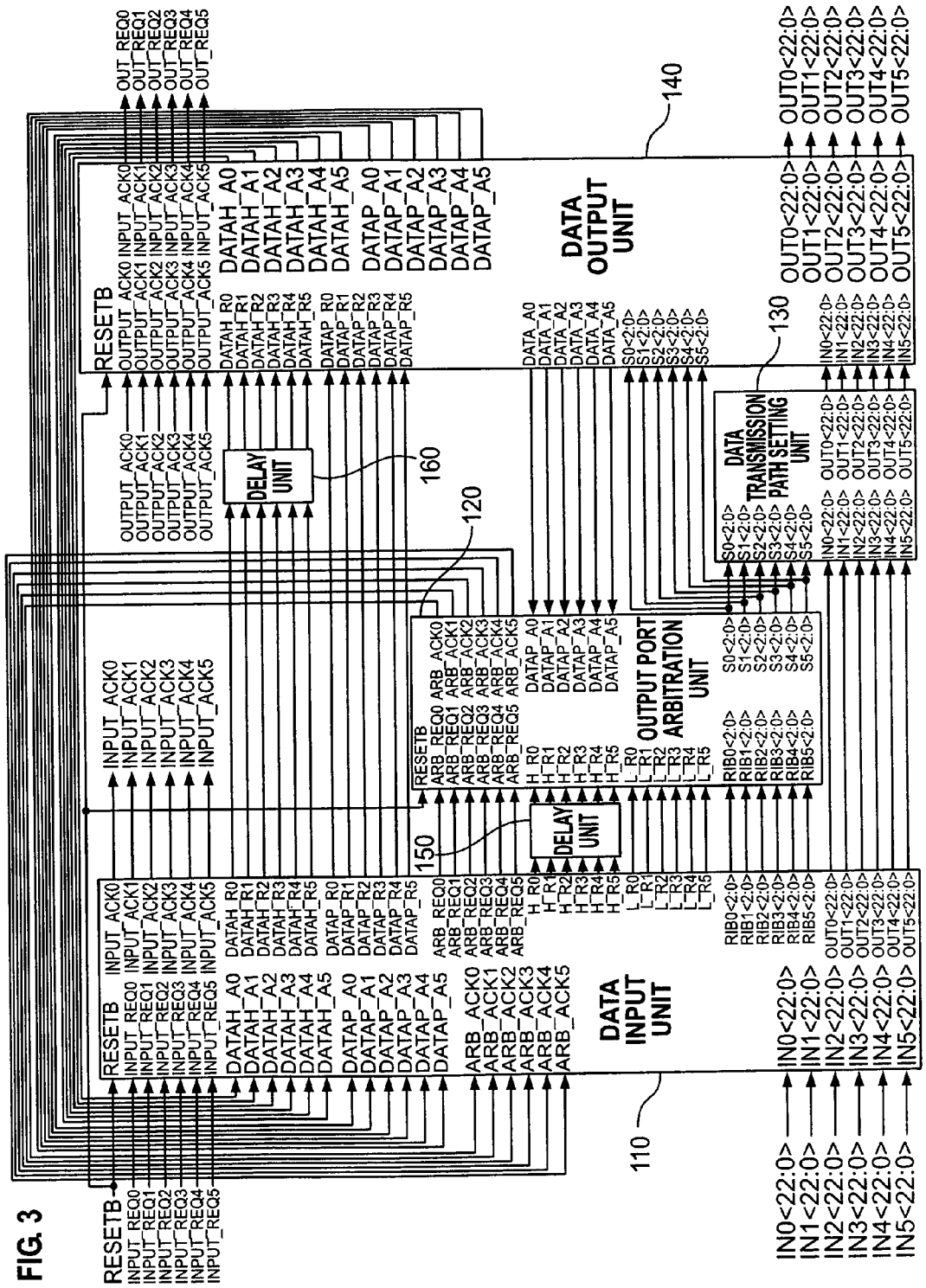
FIG. 3 is a detail construction diagram of the asynchronous switch shown in FIG. 2.

FIG. 3 is a detail construction diagram of the asynchronous switch shown in FIG. 2.

Figure 4B:
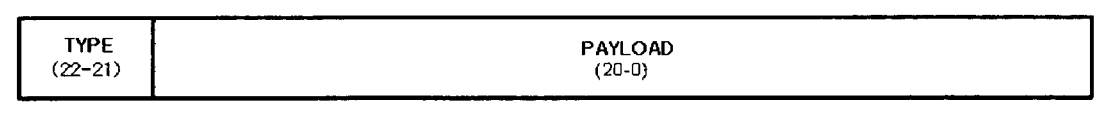

In advance, six of 23-bits data (in0 <22:0>, in1<22:0>, in2<22:0>, in3<22:0>, in4<22:0>, and in5<22:0>) are inputted to the data input unit 110, and an input data packet has the format as shown in FIG. 4. The data packet is constructed with one header flit and a plurality of payload flits. FIG. 4A shows the header flit, and FIG. 4B shows the payload flit.

The header flit of FIG. 4A is constructed with a type field (2-bit), a source address field (6-bit), and routing information field (15-bit). The source address field represents a sender(IP) of data, and is assigned 6-bit so that 64 number of IP can be connected to one switch. In this case, since the maximum number of the switch to be passed is five, switch information can be expressed by 3-bit and accordingly, a routing information field becomes 15-bit. In addition, routing information is generally determined by an interface unit connecting each IP and the asynchronous switch and however, the interface unit is not related with the technique field of the present invention and the description will be omitted herein.

In the meanwhile, a payload flit of FIG. 4B is constructed with a type field (2-bit) and a payload field (21-bit). Actual data is recorded in the payload field. In this case, the type field is respectively set as 00 for the header flit, 10 for the payload flit, and 11 for final payload flit.

In the data format applied to the present invention, routing information can be regarded as a transmission path of data, that is, output port information (or input port information of a switch in which data is inputted) of the switch data is going to pass through. In other words, routing information is constructed with five bundles of 3-bit. The data input unit 110 refers the type field when data is inputted and then confirms whether the flit is the header flit or the payload flit. After that, the data input unit 110 confirms the lowermost 3-bit of routing information in case of the header flit. This lowermost 3-bit is information for confirming an output port of a pertinent switch. The asynchronous switch transfers this header flit to next switch identified by the lowermost 3-bit. Moreover, this transmission path is continuously maintained, and then a payload flit after the header flit is transfers to next switch by the same output port. After transmitting final payload, other data packet can use the output port.

In addition, the data input unit 110 confirms a lower 3-bit of the header flit and acquires output port information. After that, the data input unit 110 deletes lower 3-bit information, shifts the rest of 12-bit routing information to the right by 3-bit, and then sets the uppermost 3-bit (from the twelfth bit to the fourteenth bit) to "0". By performing this, after the header flit is transferred to next switch, output port information can be acquired using the lowermost 3-bit of the header flit in next switch.

Additionally, a rest signal (resetb), a data transmission request signal (input_req0~input_req5) transferred from a data sender, a header storage completion signal (Datah_a0~Datah_a5) and transferred from the data output unit 140 a payload storage completion signal (Datap_a0~Datap_a5) and an arbitration signal request response signal (Arb_ack0~Arb_ack5) are inputted to the data input unit 110.

The data packet inputted to six input ports receives the number according to an input port and is processed by another module performing the same function. The input port is constructed with four lower ports and two upper ports. Data inputted to four lower ports is processed in the pertinent lower input process module, and data inputted to two upper ports is processed by the pertinent upper input process module. These are shown in FIG. 5.

Figure 5:
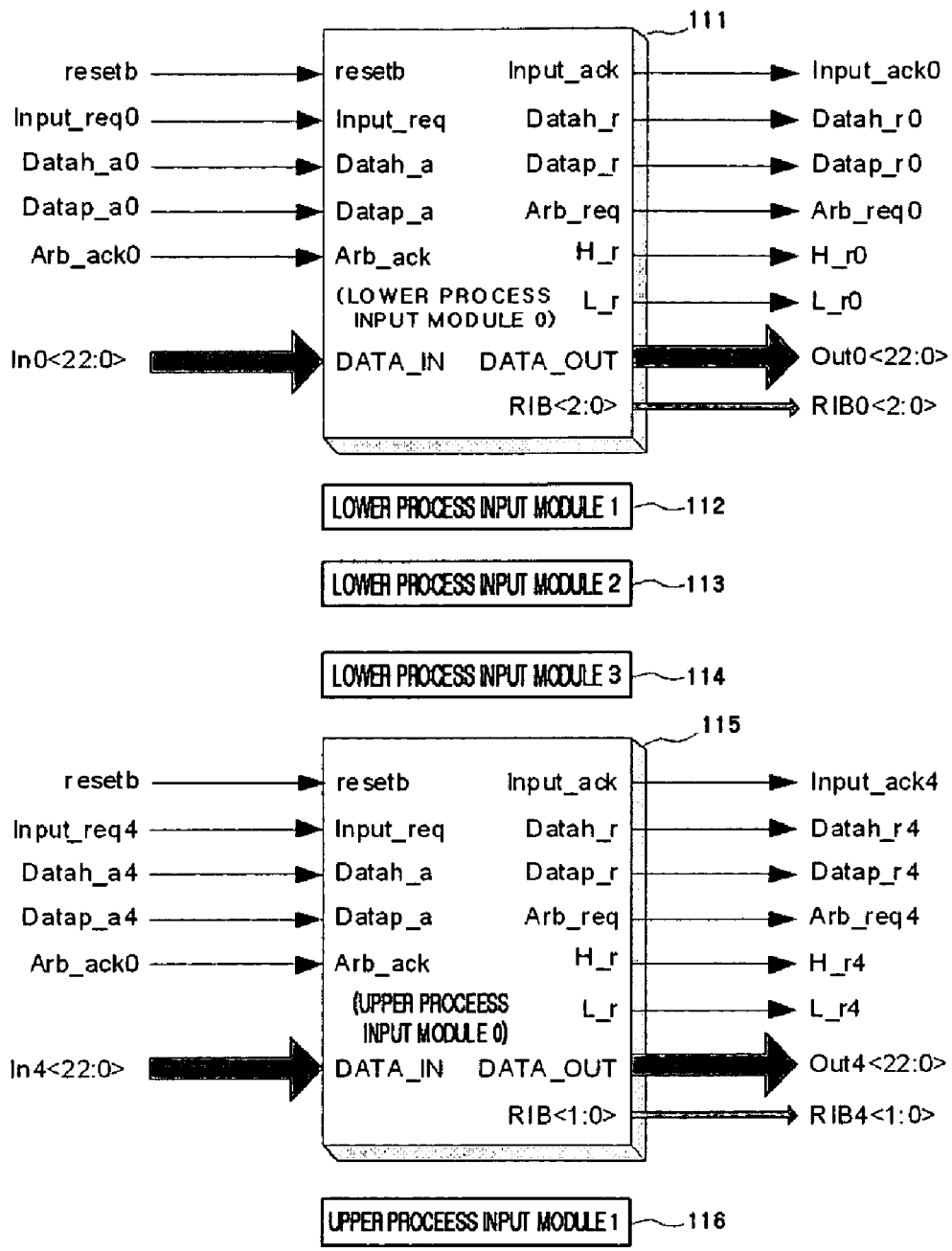
FIG. 5 is a detail construction diagram of a data input unit applied to the present invention.

FIG. 5 is a detail construction diagram of the data input unit applied to the present invention and shows four lower input process modules 111, 112, 113, and 114, and two upper input process modules 115 and 116.

Comparing the lower input process module with the upper input process module, the lower input process modules 111, 112, 113, and 114 can transfer data to six output ports including themselves so that they have 3-bit routing information bit (RIB<2:0>. To the contrary, the upper input process modules 115 and 116 always output data to the upper output port so that they have 2-bit routing information bit RIB<1:0>.

Each of the input process modules 111~116 confirms the type field of data when 23-bit data is inputted and then processes it according to whether inputted data is the header flit or a payload flit. That is, data is inputted together with a data transmission request signal Input_req (In<22:0>) so that if the type field is the header flit, the data transmission request response signal Input_ack is transferred to the data sender, and the header flit is stored in the buffer. After that, an arbitration request signal Arb_req together with routing information RIB are transferred to the output port arbitration unit. If the response Arb_ack with respect to the arbitration request signal Arb_req is received, a header storage request signal Datah_r is transferred to the data output unit 140. After outputting the header flit (Out<22:0>), data out unit 140 transfer a header storage completion signal Datah_a informing the output result to the data input unit 110.

In the meanwhile, if the inputted data is a payload flit, it is transferred through a path of the header flit. Accordingly, the data transmission request response signal Input_ack is transferred to the data sender and the payload flit is stored in the buffer. Then, the payload storage request signal Datap_r is transferred to the data output unit 140. After outputting the payload flit (Out<22:0>), the data output 140 transfers the payload storage completion signal Datap_a, informing that the output result is transferred, to the data input unit 110.

A header flit process request signal H_r is a signal transferred to the output port arbitration unit 120 together with the arbitration process request signal by the data input unit 110. In addition, the header flit process request signal H_r means that one data packet is to be transferred. Final payload process request signal L_r means that final payload flit with respect to one data packet is transferred. Therefore, until final payload storage completion signal becomes activated, that is, until final payload flit is outputted, a pertinent output port is occupied so as to transfer specific data. Furthermore, routing information transferred to the output port arbitration unit 120 needs 3-bit, 2-bit in case of the lower input process module and the upper input process module respectively. After confirming lowermost routing information (3-bit), routing information is shifted to the right to be referred by next switch.

This input process module is more fully described hereinafter.

Figure 6:
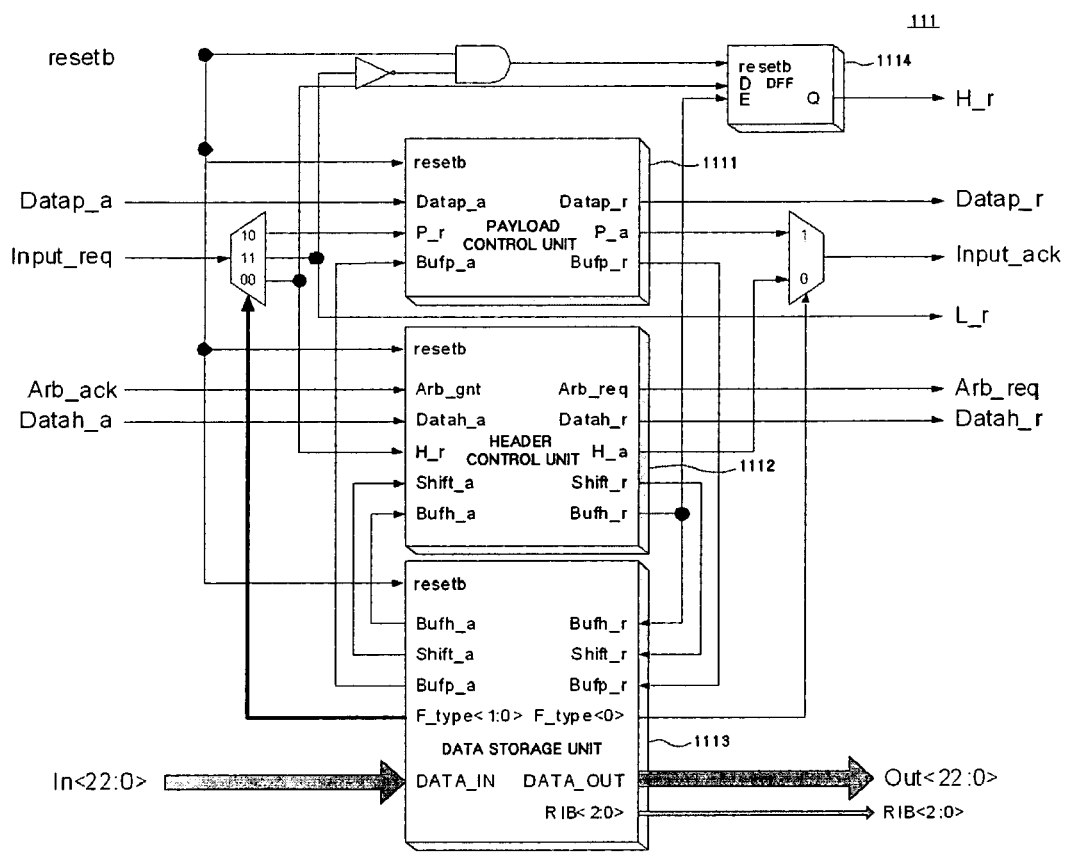
FIG. 6 is a detail construction diagram of a lower input process module shown in FIG. 5.
Figure 7:
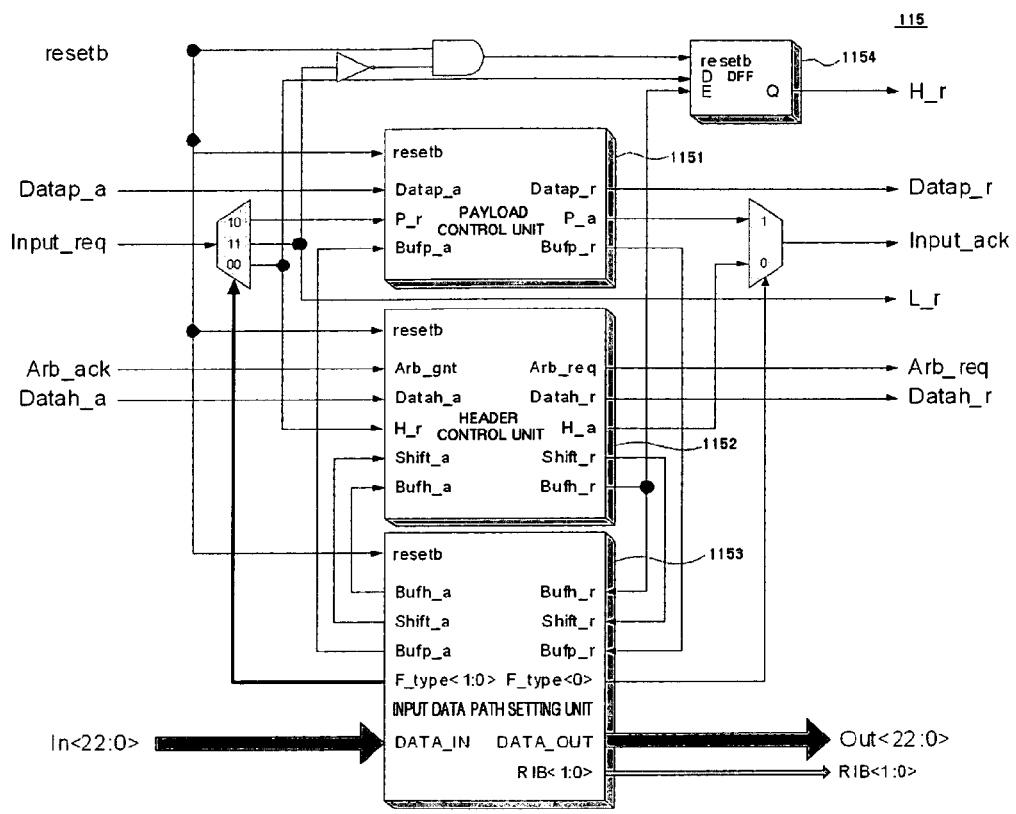
FIG. 7 is a detail construction diagram of an upper input process module shown in FIG. 5.

FIG. 6 is a detail construction diagram of the lower input process module of FIG. 5. FIG. 7 is a detail diagram of the upper input process module of FIG. 5. The lower and upper process modules are to be described at the same time, because they are almost the same except for slight difference in a routing information bit.

As shown in Figs, the input process module includes a payload control units 1111 and 1151, header control units 1112, 1152, data storage units 1113 and 1153, and header flit process request signal generating units 1114 and 1154. Each of the construction units is controlled by the reset signal resetb.

In the event that the data transmission request signal Input_req from the data sender and data is inputted In<22:0> to the data storage units 1113 and 1153, the data storage units 1113 and 1153 refer type field F_type<1:0> among data fields of an inputted data to confirm a kind of the flit. Then, if the inputted data flit is confirmed to be a header flit (00), the inputted data flit is transferred to an input node D of the header flit process request signal generating units 1114 and 1154, and the header flit process request signal H_r of the header control units 1112 and 1152 become activated.

Continuously, the header control units 1112 and 1152 transfer the arbitration request signal Arb_req to the output port arbitration unit 120 and receives an response signal Arb_ack with respect to the arbitration request signal Arb_req. In addition, the header control units 1112 and 1152 request to the data storage units 1113 and 1153 (Bufh_r) to store the header flit and to shift routing information (Shift_r). Moreover, a header flit buffering request signal Bufh_r is transferred to an input node E of a header flit process request generating units 1114 and 1154 to be used for generating the header flit process request signal H_r showing that an output port by routing information is occupied. Accordingly, the header flit process request units 1114 and 1154 output the header flit process request signal H_r showing that pertinent output port is occupied by the reset signal resetb, a header flit input signal D, and a header flit buffering request signal E. In addition, the header flit process request units 1114 and 1154 transfer the header storage completion signal Datah_r to the data output unit 140.

In another approach, the data storage units 1113 and 1153 store pertinent header flit according to the header flit buffering request signal transferred from the header control units 1112 and 1152, transfer a response signal Bufh_a with respect to the pertinent header flit to the header control units 1112 and 1152, transfer routing information RIB to the output port arbitration unit 120, shifts a routing information bit column to the right as much as 3-bit according to the routing information shift request signal Shft_r, fill the uppermost 3-bit of the routing information field with 0, and then transfer the response signal Shift_a with respect to these results to the header control units 1112 and 1152. Routing information is expressed by 3-bit (RIB<2:0>) or 2-bit (RIB<1:0>) in case that an input process module is a lower input process module or an upper input process module respectively. In addition, the data storage units 1113 and 1153 transfer data Out<22:0> to the data transmission path setting unit 130.

In the meanwhile, if the data transmission request signal Input_req from the data sender is inputted and data is inputted (In<22:0>) to the data storage units 1113 and 1153, the data storage units 1113 and 1153 confirm a kind of flits by extracting a type field (F_type<1:0>) among data fields of the inputted data. If an input data flit is a payload flit, the data storage units 1113 and 1153 inform this result to a payload control units 1111 and 1151 so that a payload flit process request signal P_r is activated. Therefore, payload control units 1111 and 1151 output a response signal P_a with respect to the payload flit process request and transfer a transmission request response signal Input_ack informing that data began to be transferred to the data sender using the response signal P_a with respect to a payload flit process request and the type information F_type<0> of the flit.

Continuously, the payload control units 1111 and 1151 transfer the payload storage completion signal Datap_r to the data output unit 140 and request Bufp_r the data storage units 1113 and 1152 to store the payload flit. Accordingly, the data storage units 1113 and 1153 store pertinent payload flit according to the payload flit buffering request signal Bufp_r transferred from the payload control units 1111 and 1151 and then transfer the response signal Bufp_a with respect to this result to the payload control unit 1111 and 1151.

After that, the data storage units 1113 and 1153 transfer data Out<22:0> to the transmission path setting unit 130, and the payload flit is transferred to the data output unit 140 through a transmission path of the header flit (a transmission path determined by the output port arbitration unit 120).

In another approach, the data output unit 140 stores data, and then, transfers signals indicating that pertinent data flit is outputted, that are, a the payload storage completion signal Datap_a and the header storage completion signal Datah_a to the payload control units 1111 and 1151 and the header control units 1112 and 1152.

Furthermore, if input data is the final payload flit after confirming the type field F_type<1:0> among data fields of the data inputted to the data storage units 1113 and 1153, the input data is transferred to the header flit request signal generating units 1114 and 1154 so that the header flit process request signal H_r is converted to an inactivated state. An output port occupied to transfer pertinent data packet is released by activating final payload process request signal L_r.

Figure 8:
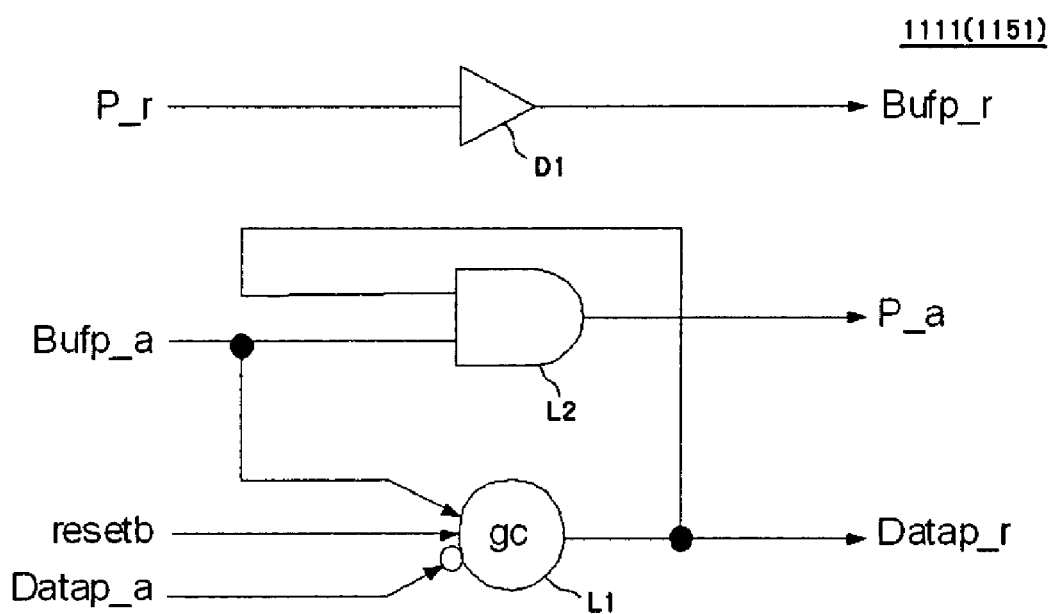
FIG. 8 is a detail construction diagram of a payload control unit shown in FIGS. 6 and 7.

FIG. 8 is a detail construction diagram of a payload control unit of FIGS. 6 and 7.

As shown in FIG. 8, after the payload control units 1111 and 1151 include a delay element D1 for delaying the payload flit process request signal P_r generated from the data transmission request signal Input_req for predetermined time, and then generating a signal bufp_r requesting to store the payload flit. This payload flit buffering request signal bufp_r is transferred to the data storage units 1113 and 1153.

Moreover, the payload control units 1111 and 1151 include the first logic element (C-element, gc; L1) and the second logic element (NAND gate; L2). The first logic element receives a payload flit buffering request signal bufp_a from the data storage units 1113 and 1153, a reset signal resetb, and a storage completion signal Datap_a with respect to previous payload flit from the data output unit 140 as inputs. Then, if two input values of a previous state are "0", the first logic element outputs "0". If one of input values is "0", the first logic element continuously outputs "0". If all input values became "1", the first logic element continuously outputs "1". If one of input values is "1", the first logic element continuously outputs "1". The second logic element receives the output signal of the first logic element and payload flit buffering response signal bufp_a as inputs. Then, the second logic element outputs "1" if two input values are "1". In this case, the first logic outputs "0" if the reset signal is inputted. The input/output relation can be expressed by following truth table 1.

TABLE 1

| Input 1 [Bufp_a] | Input 2 [Datap_a] | Output [Datap_r] |
|---|---|---|
| 0 | 0 | 0 |
| 0 | 1 | 0 |
| 1 | 0 | 0 |
| 1 | 1 | 1 |
| 1 | 0 | 1 |
| 0 | 1 | 1 |
| 0 | 0 | 0 |

More concretely, the first logic element L1 has a response signal bufp_a of 1 with respect to the payload flit buffering rquest in processing an initial payload flit and a storage completion signal Datap_a of 0 with respect to previous payload flit. As a result, the payload storage request signal Datap_r is outputted to be "1". Moreover, since the output value of the first logic element L1 and the payload flit buffering request response signal bufp_a are "1", the output signal of the second logic element L2, that is, a response signal P_a with respect to the payload flit process request signal is activated so that it is transferred to the data sender as the data transmission request signal.

Figure 9:
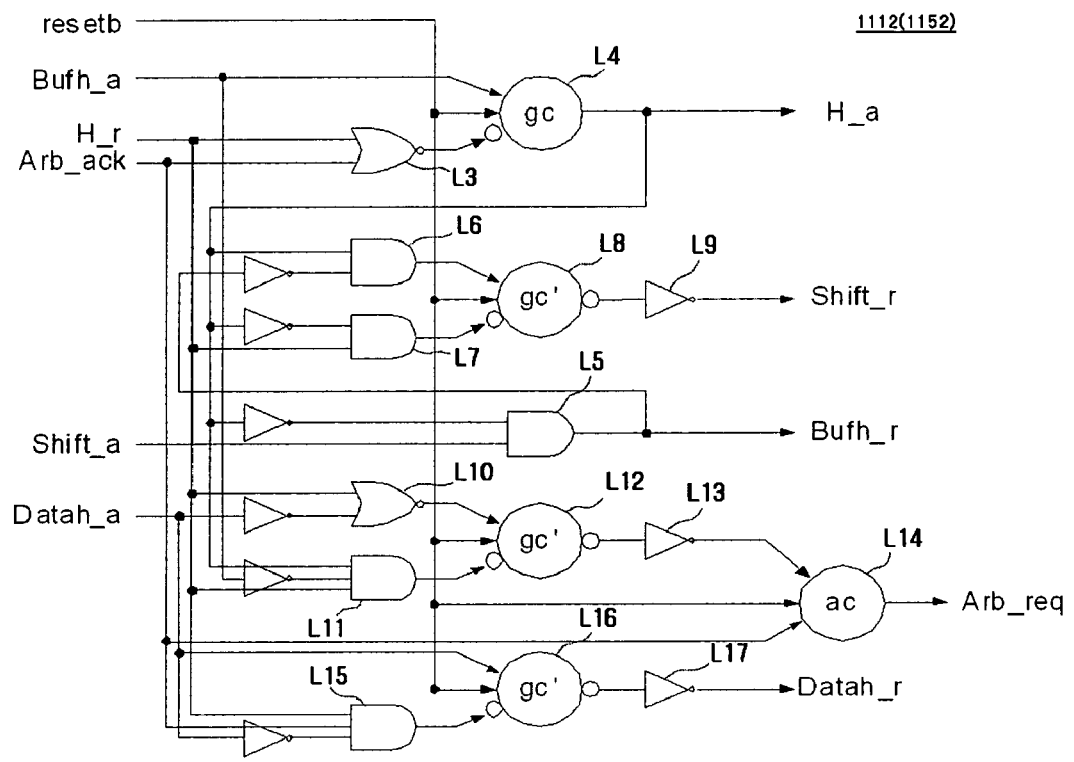
FIG. 9 is a detail construction diagram of a header control unit shown in FIGS. 6 and 7.

FIG. 9 is a detail construction diagram of a header control unit shown in FIGS. 6 and 7.

The header control units 1112 and 1152 includes the third logic element L3 which receives the header flit process request signal H_r and an response signal Arb_ack with respect to the arbitration request and outputs "1" if all input values are "0"; the fourth logic element L4 which receives an output value of the third logic element L3, reset signal resetb and an response signal bufh_a with respect to the header flit buffering request and outputs a response signal H_a with respect to a header flit process request; the fifth logic element L5 which receives inverse value of the fourth logic L4 and response signal shift_a in response to shift request as inputs and outputs "1" if two input values are "1"; the eighth logic element L8 which receives a reset signal resetb, the first input and the second input and outputs "1" if two input values are "0", maintains an output value "1" if any one input value is "0", outputs "0" if all input values become "1", the eight logic element for maintaining an output value "0" if any one input value is "1", wherein the first input is an output value of the sixth logic element L6 which receives an output value of the fourth logic element L4 and an inverse value of the fifth logic element L5 and outputs "1" if two input values are "1", and the second input is an output value of the seventh logic element L7 which receives an inverse value of the fourth logic element L4 and a header flit process request signal H_r and outputs "1" if two input values are "1"; the ninth logic element L9 which inverts the output value of the eighth logic element L8 to output a shift request signal shift_r; the twelfth logic element L12 which receives the first input and the second input, wherein the first input is an output value of the tenth logic element L10 which receives a reset signal resetb, header flit request signal H_r, an inverse value of a header storage completion signal Datah_a as inputs, and outputs "1" if two input values are "0" and the second input is an output value of the eleventh logic element L11 which receives an output value of the fourth logic element L4, an inverse value of a header flit buffering request response signal Bufh_a, and a header flit process request signal H_r as inputs, and outputs "1" if two input value are "1"; the thirteenth logic element L13 which inverts an output of the twelfth logic element L12; the fourteenth logic element L14 which respectively receives a reset signal resetb, output value of the thirteenth logic element L13 as the first input and an response signal Arb_ack with respect to an arbitration request as the second input and outputs an arbitration request signal Arb_req; the sixteenth logic element L16 which respectively receives a reset signal resteb and a header storage completion signal Datah_a and an output value of the fifteenth logic element L15 as the first input and the second input that is the output value of the fifteenth logic element L15 which receives a header flit process request signal H_r, an response signal Arb_ack with respect to the arbitration request signal, and an inverse value of a header storage completion signal Datah_a as inputs and outputs "1" if all input values are "1"; and the seventeenth logic element L17 which inverts an output of the sixteenth logic element L16 to generate a header storage request signal Datah_r. In this regard, the fourteenth logic element L14 outputs "0" if the reset signal is inputted. The input/output relation can be expressed by following truth table 2.

TABLE 2

| Input 1 [L13] | Input 2 [Arb_ack] | Output [Arb_req] |
| --- | --- | --- |
| 0 | 0 | 0 |
| 0 | 1 | 1 |
| 1 | 0 | 1 |
| 1 | 1 | 1 |

TABLE 2-continued

| Input 1 [L13] | Input 2 [Arb_ack] | Output [Arb_req] |
| --- | --- | --- |
| 1 | 0 | 0 |
| 0 | 1 | 1 |
| 0 | 0 | 0 |

The operation of the header control units 1112 and 1152 will be more fully described hereinafter. In advance, if the header flit process request signal H_r generated from the data transmission request signal input_req becomes activated, an output of the fourth logic element L4 is "0". Accordingly, since the first input and the second input of the eighth logic element L8 become "0", and an output signal of the eighth logic element L8 becomes "0". As a result, an inverted signal in the ninth logic element L9, that is, the shift request signal Shift_r is activated to be transferred to the data storage units 1113 and 1153.

After that, when routing information is shifted and then a response signal Shift_a with respect to the shift request is transferred by the data storage unit, an output signal of the fifth logic element L5, that is, the header flit buffering request signal Bufh_r is activated to be transferred to the data storage units 1113 and 1153. Continuosuly, after storing the header flit in the data storage units 1113 and 1153, the response signal Bufh_a with respect to the header flit storage request is transferred. Therefore, the header flit process completion signal H_a, that is, an output signal of the fourth logic element L4 becomes "1", the first and the second input of the twelfth logic element L12 become "0" and "1" respectively, and "0" is outputted from the twelfth logic element L12. Since the first input and the second input of the fourteenth logic element L14 become "1" and "0" respectively, the arbitration request signal Arb_req becomes activated.

Continuously, the response signal Arb_ack from the arbiter 120 with respect to the arbitration request is received. The first input and the second input of the sixteenth logic element 0" and "1" respectively. As a result, "0" is outputted from the sixteenth logic element L16 and then inverted by the seventeenth logic element L17. The header storage request signal Datah_r is transferred to the data output unit 140. Then, the header storage completion signal Datah_ack from the data output unit 140 is received.

Figure 10A:
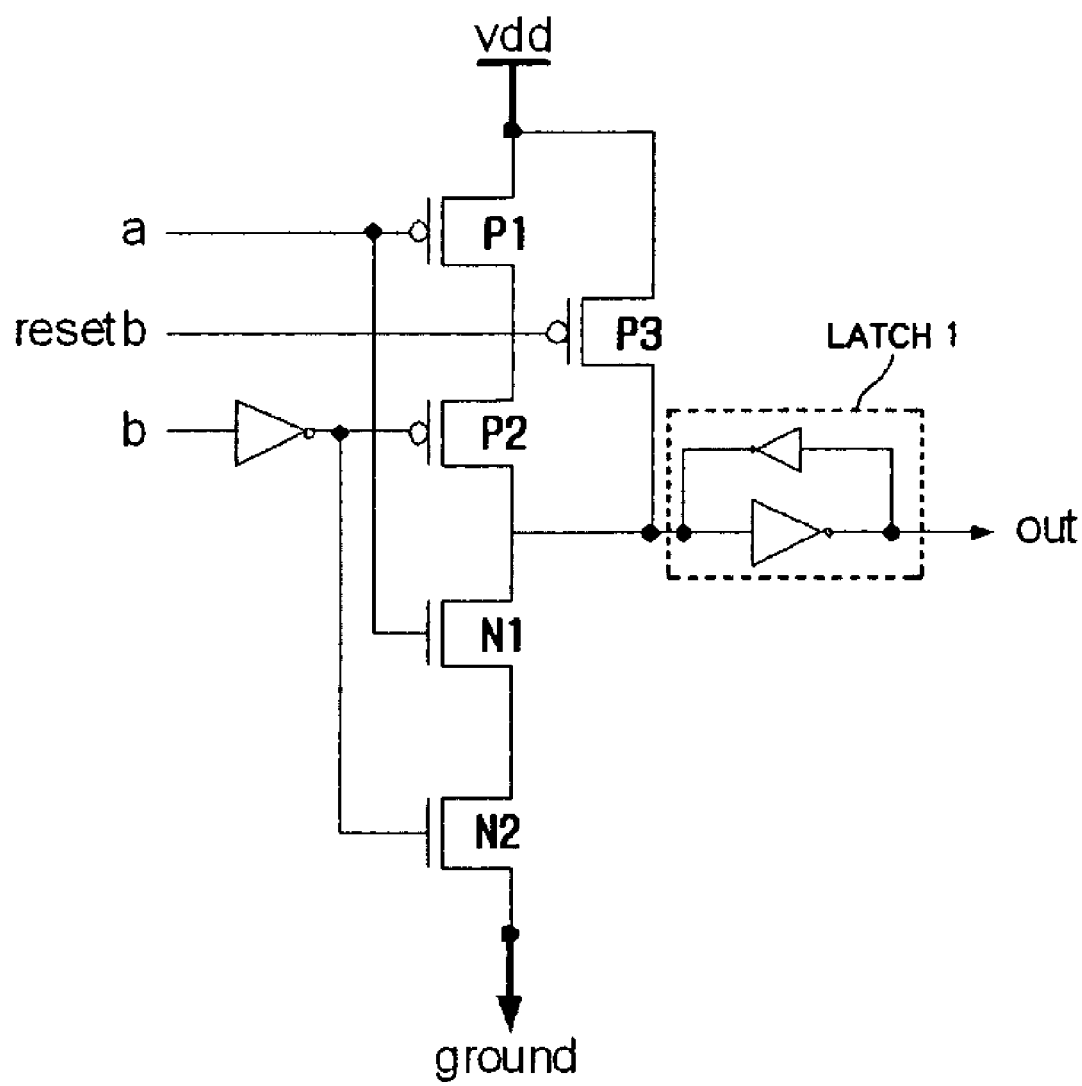
FIGS. 10A to 10C shown an example of a C-element circuit and an asymmetric C-element circuit, which are applied to the present invention.
Figure 10B:
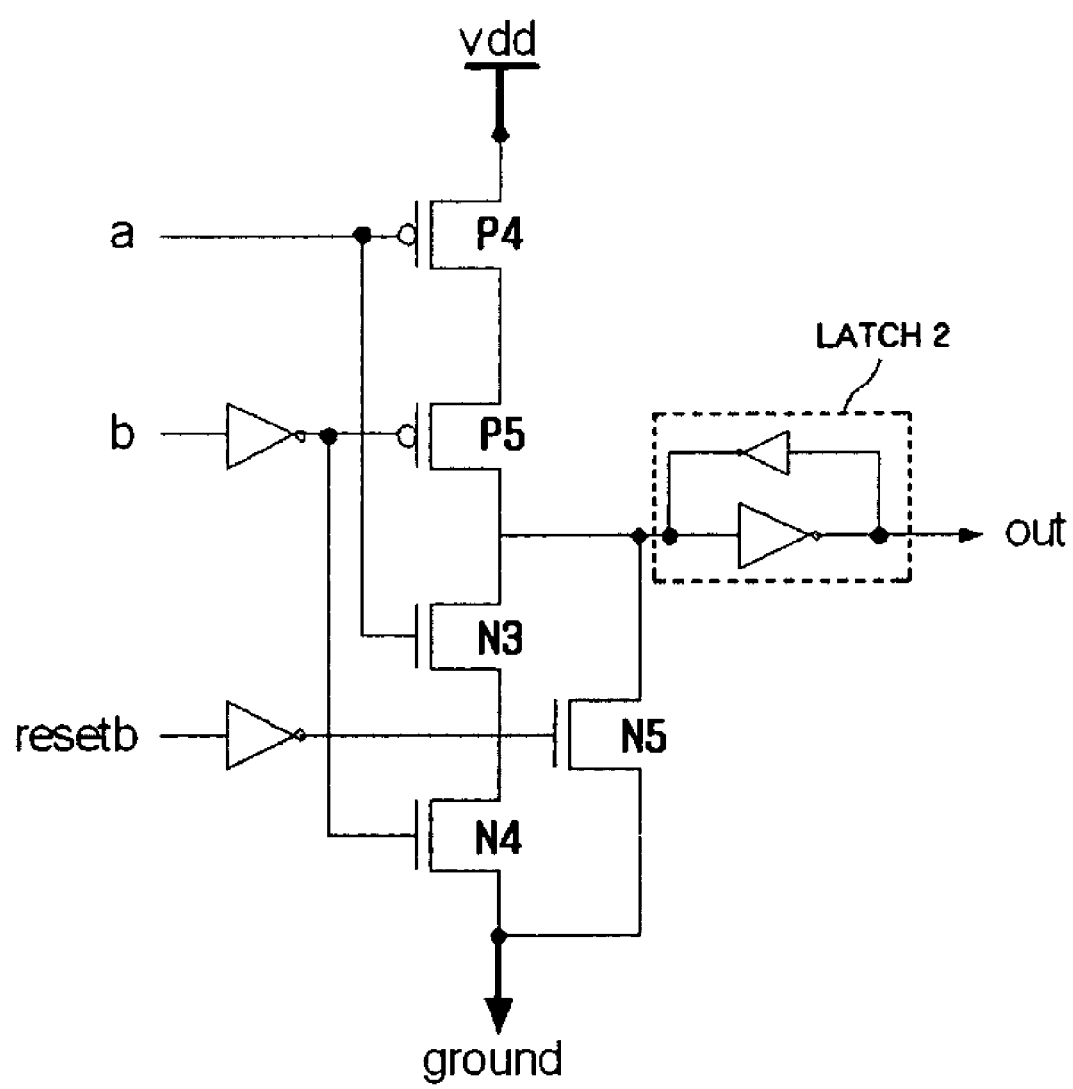
Figure 10C:
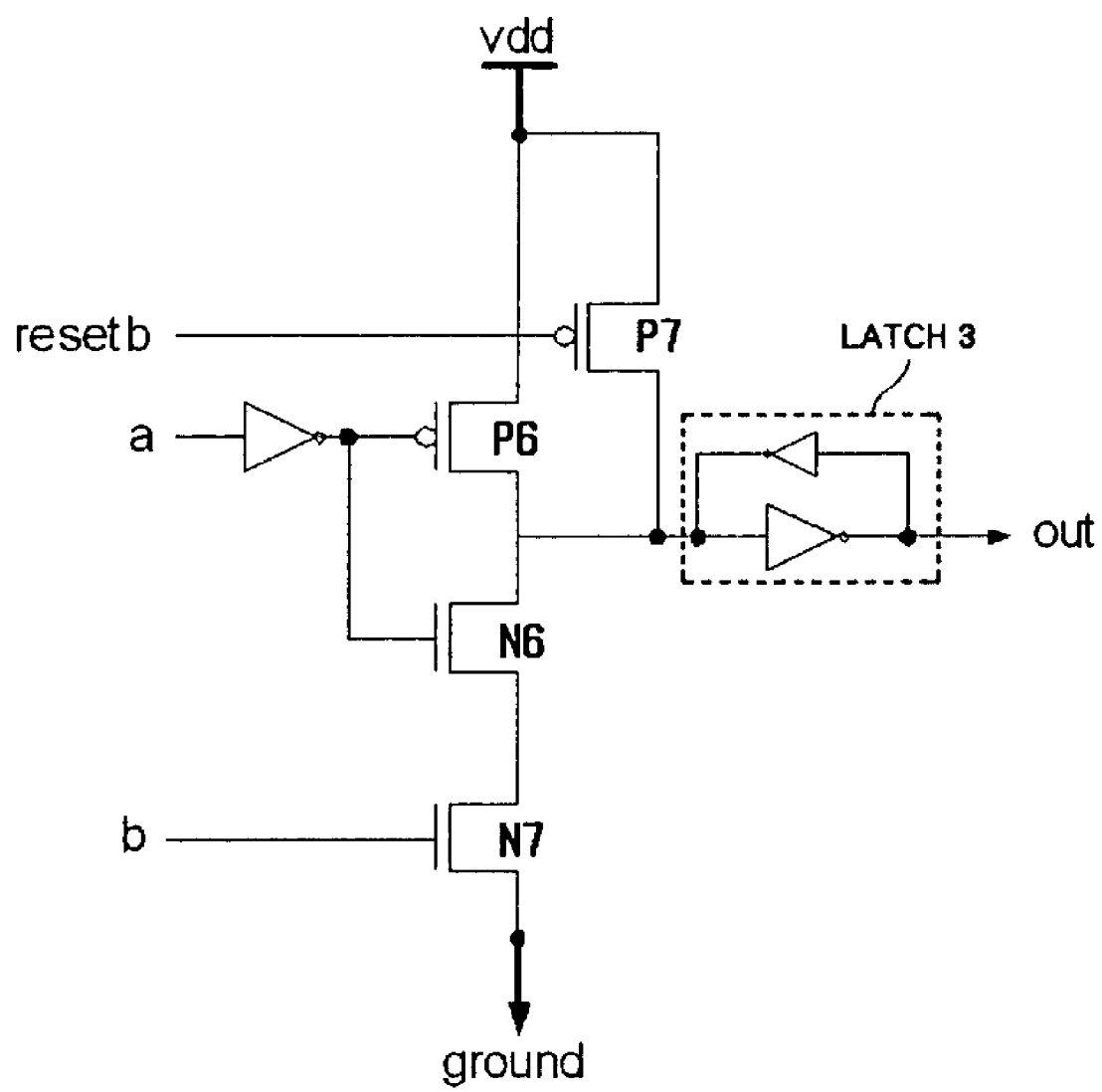

FIGS. 10A to 10C are a C-element circuit and asymmetric C-element circuit.

FIG. 10A is an embodiment of the first logic element L1 of FIG. 8 and the fourth logic element L4 of FIG. 9. It comprises the first P-type transistor P1 connected to power supply node and driven by the first input signal a; the second P-type transistor P2 serially connected to the first P-type transistor P1 and driven by an inverse signal of the second input signal b; the first N-type transistor N1 serially connected to the second P-type transistor P2 and driven by the first input signal a; the second N-type transistor N2 serially connected between the first N-type transistor and a ground node and driven by an inverse signal of the second input signal b; the third P-type transistor P3 connected between the power supply node and an output node of the second P-type transistor P2 and driven by the reset signal resetb; and the first latch circuit as a delay element connected to the output node of the second P-type transistor P2.

Next, FIG. 10B is an embodiment of the eighth, the twelfth, and the sixteenth logic elements L8, L12, and L16. It comprises the fourth P-type transistor P4 connected to the power supply node and driven by the first input signal a; the fifth P-type transistor P5 serially connected to the fourth P-type transistor P4 and driven by an inverse signal of the second input signal b; the third N-type transistor N3 serially connected to the fifth P-type transistor P5 and driven by the first input signal a; the fourth N-type transistor N4 serially connected between the third N-type transistor N3 and a ground node and driven by an inverse signal of the second input signal b; the fifth N-type transistor N5 connected between the output node of the fifth P-type transistor P5 and the ground node and driven by the reset signal resetb; and the second latch connected to the output node of the fifth P-type transistor P5 as a delay element.

FIG. 10C is an embodiment of the fifteenth logic element L14. It comprises the sixth P-type transistor P6 connected to a power supply node and driven by an inverse signal of the first input signal a; the sixth N-type transistor N6 serially connected to the sixth P-type transistor P6 and driven by an inverse signal of the first input signal a; the seventh N-type transistor N7 serially connected between the sixth N-type transistor N6 and the ground node and driven by the second input signal b; the seventh P-type transistor P7 connected between the power supply node and the output node of the sixth P-type transistor P6 and driven by the reset signal resetb; and the third latch circuit connected to the output node of the sixth P-type transistor P6 as a delay element.

Figure 11A:
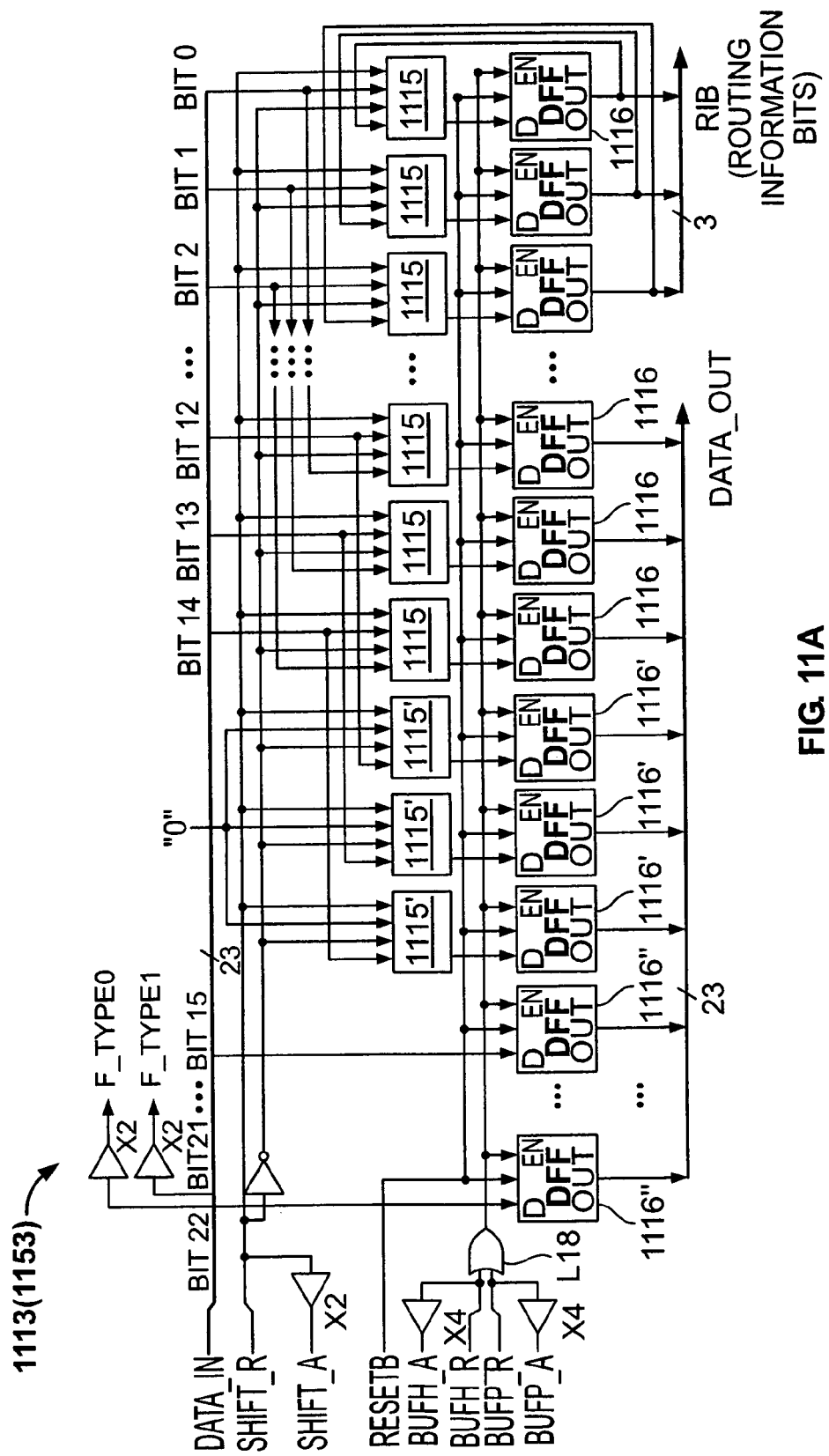
FIGS. 11A and 11B are detail construction diagrams of a data storage unit shown in FIGS. 6 and 7.
Figure 11B:
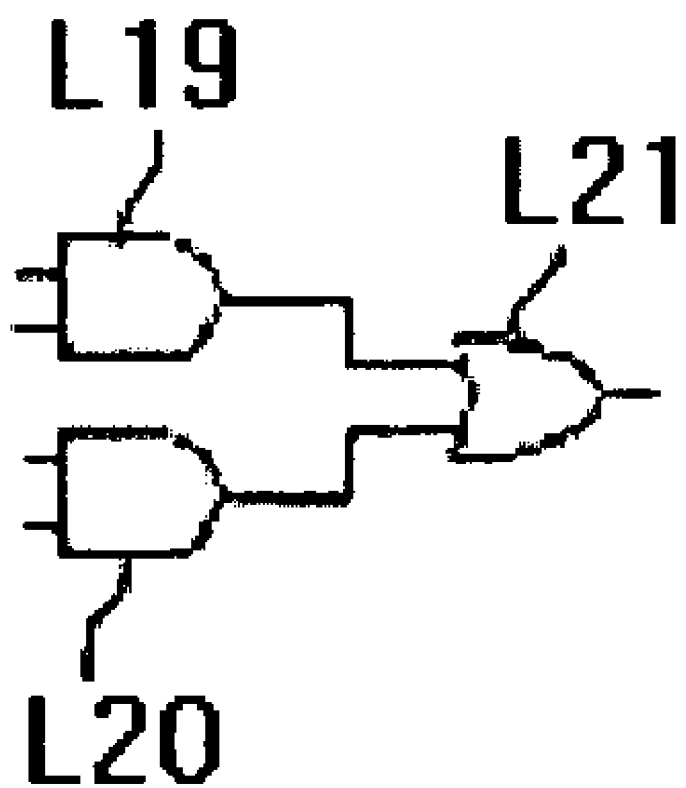

FIGS. 11A and 11B are detail construction diagrams of a data storage unit shown in FIG. 7.

Referring to FIG. 11A, it comprises data selection means for respectively receiving $0^{th}$ to $14^{th}$ data bits of the inputted 23-bit data, a shift request signal Shift_r, an inverse signal of the shift request signal, and right 3-bit data bit; three subsidiary data selection means 1115' for respectively receiving data bit value 0, the shift request signal Shift_r, an inverse signal of the shift request signal, and right 3-bit data bit as inputs; lower data storage means 1116 controlled by the reset signal resetb and for receiving an output signal of the data selection unit 1115 and an output signal of the eighteenth logic elements L18 as inputs, and storing an output value of the data selection means 1115; subsidiary data storage means 1116' controlled by the reset signal resetb, for receiving an output value of subsidiary data selection means 1115' and the output signal of the eighteenth logic element L18 and storing an output value of the data selection means 1115; and upper data storage means 1116'', controlled by the reset signal resetb, for receiving $15^{th}$ to $22^{th}$ data bits with respect to 23-bit data and an output signal of the eighteenth logic element L18 as inputs and storing the data bit value. Moreover, the uppermost 2-bit among input data bit columns is inputted to the payload control units 1111 and 1151 or the header control units 1112 and 1152 according to types F_type0 and F_type1 of the data flit.

In this case, the eighteenth logic element L18 receives the header flit buffering request signal Bufh_r and the payload flit buffering request signal Bufp_r, and can be embodied with OR gate which outputs "1" if one of two signals is "1". In addition, since three lower data selection means 1115 do not receive right 3-bit data bit, they receive an output value of the lower data storage means 1116 connected to each output node.

In the meanwhile, the shift request signal Shift_r, the header flit buffering request signal Bufp_r, and the payload flit buffering request signal Bufp_r are delayed for predetermined time, and they are transferred to the payload control unit 1111 and 1151 and the header control unit 1112 and 1152 as the shift request response signal Shift_a, the header flit buffering response signal Bufh_a, and the payload flit buffering response signal Bufp_a respectively.

Additionally, although the present embodiment describes the case routing information for one switch is assigned 3-bits, it is clear that the number of subsidiary selection unit and shift bit of routing information can be changed according to routing information bit.

FIG. 11B is a construction embodiment of the data selection means 1115 and the subsidiary data selection means 1115'. It comprises the nineteenth logic element L19 which receives the shift request signal Shift_r and data bit as inputs and outputs "1" if two inputs are "1"; the twentieth logic element L20 which receives an inverse signal of the shift request signal Shift_r and right 3-bit data bit (in case of three lower data selection means, an output value of the data storage means connected to each of lower 3-bit data selection means) and outputs "1" if two inputs are "1"; the twenty-first logic element L21 which receives output values of the nineteenth and the twentieth logic elements L19 and L20 and outputs "1" if one of the input values is "1".

The operation of these data storage units 1113 and 1115 will be more fully described hereinafter in cases that input data is a header flit and a payload flit respectively.

First, if the header flit is inputted, $21^{th}$ to $22^{th}$ data bit values, that is, the data type fields F_type0 an F_type1 are detected to be transferred to the header control units 1112 and 1152. Accordingly, the shift request signal Shift_r and the header flit buffering request signal Bufh_r are activated. In this case, an output of the nineteenth logic element L19, which forms the data selection means 1115 and the subsidiary data selection means 1115', is determined by an inputted data bit value. The output of the twentieth logic element L20 becomes "0". The output value of the twenty-first logic element L21, that is, the output values of the data selection means 1115 and the subsidiary data selection means 1115' become data bit value. Resultantly, each of the data bit value is stored in the lower data storage means 1116 and the subsidiary data storage means 1116' without any changes.

In case of the header flit, the lowermost 3-bit represents routing information. Therefore, the lower data storage means 1116 outputs the lowermost 3-bit information to the output port arbitration unit 120.

Moreover, 23-bit data except for lower 3-bit is outputted to the data transmission path setting unit 130. At this time, an upper 3-bit is filled with "0" by the subsidiary data selection means 1115' using "0" as an input data value. In addition, in the data type fields 21-22 and a source address fields 15-20, original data is stored in the upper data storage unit 1116' without any changes.

In the meanwhile, when the payload flit is inputted, the output value of the nineteenth logic element L19 which forms the data selection means 1115 and the subsidiary data selection means 1115' becomes "0", because the shift request signal Shift_r is in an inactivate state. The output value of the twentieth logic element L20 would be a data bit value (in case of three lowermost data selection means, the output of the data storage means connected to each of the them) of 3-bit to the right.

At this time, the value stored in three data storage means 1116 is not used in case of the payload flit, and the value stored in the twenty-three upper data storage means is outputted as actual data. More concretely, $0^{th}$ to $14^{th}$ bits of the inputted data are shifted to the left as much as 3-bit to be stored in the lower data storage means 1116. $15^{th}$ to $17^{th}$ bits are stored in the subsidiary data storage means 1116'. $18^{th}$ to $22^{nd}$ bits are directly transferred to the upper data storage means 116 an then outputted to the data transmission path setting unit.

Now, the construction and operation of the data input unit 110 have been described, and the output port arbitration unit 120 will be described hereinafter.

Figure 12:
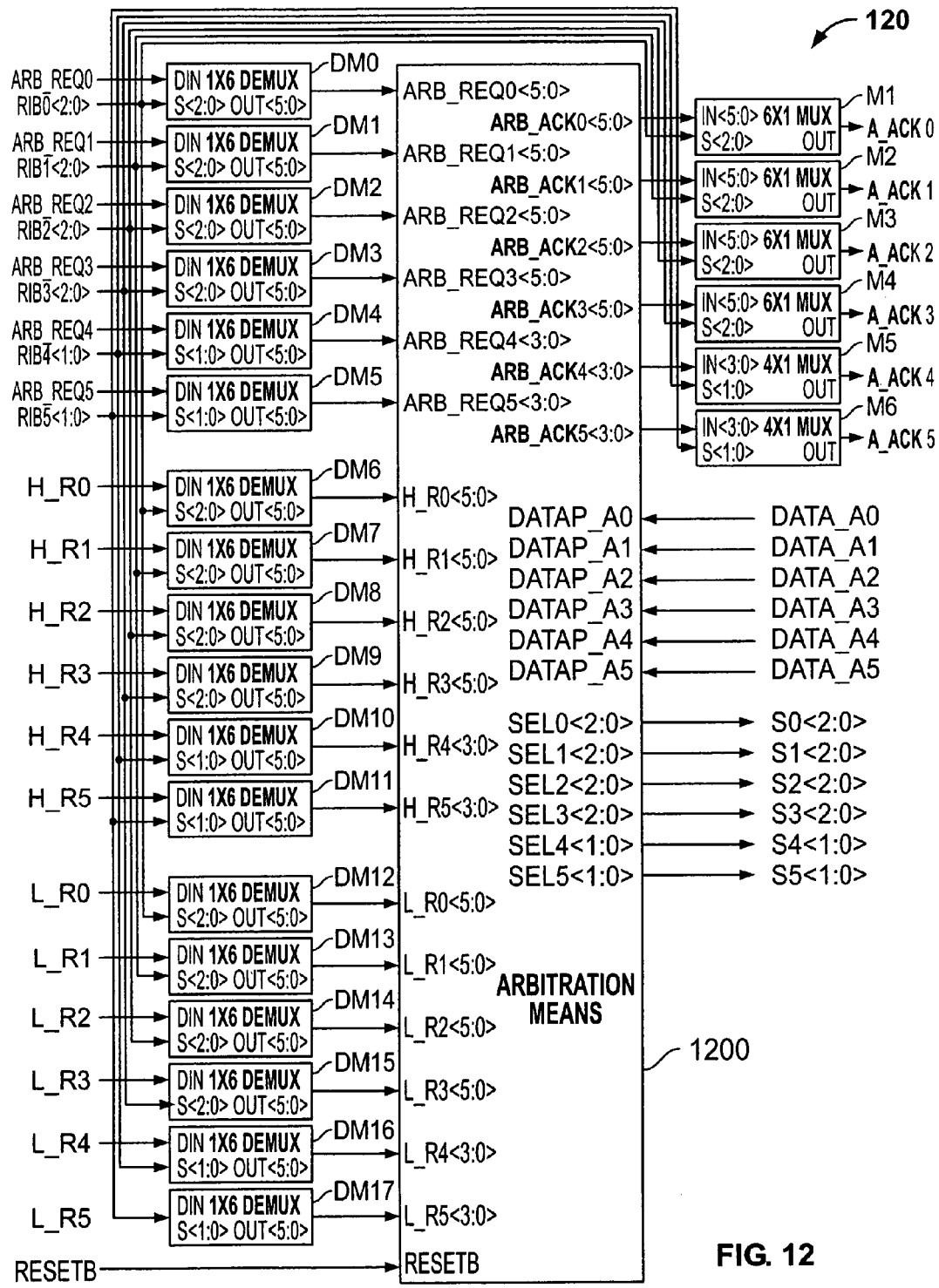
FIGS. 12 and 13 are detail construction diagrams of an output port arbitration unit applied to the present invention.

FIG. 12 is a detail construction diagram of the output port arbitration unit applied to the present invention.

As shown in FIG. 12, the output port arbitration unit 120 comprises the first to the sixth de-multiplexers DM0-DM5 which receive arbitration request signals Arb_req0~Ar_req5 with respect to each of the input ports and routing information rib of each data inputted by data input unit 110 to determine a transmission path of the each of the arbitration signals; the seventh to the twentieth de-multiplexers DM6~DM11 which receive a header flit process request signal H_r with respect to data inputted to the each of the input port and determine a transmission path of each header flit process request signal; the thirteenth to the eighteenth de-multiplexers DM12~DM17 which receive final payload process request signal L_r with respect to data inputted to each of the input port to determine a transmission path of each final payload storage completion signal; the arbitration means 1200 which generates an output port selection signal s for packet to be outputted to the same output port; and the first to the sixth multiplexers M0~M5 which transfer an arbitration result Arb_ack to the data input unit 110 according to arbitration request response signal Arb_ack and selection signal S.

Figure 13:
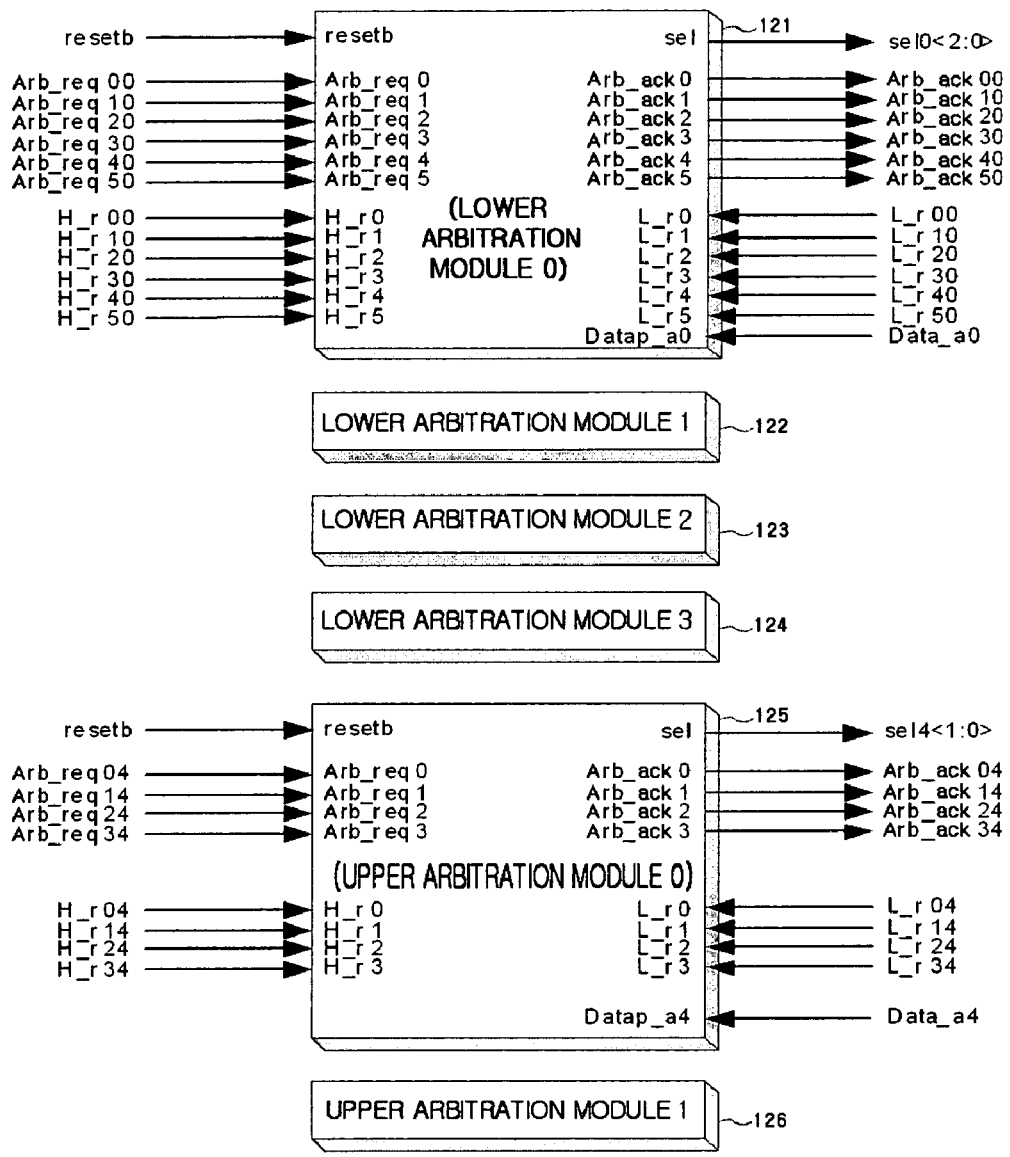

In the data input unit 110, output port arbitration with respect to a packet inputted to four lower ports and two upper ports is performed by four lower arbitration modules and two upper arbitration modules. This is shown in FIG. 13. FIG. 13 is a construction diagram of the output port arbitration unit, showing the lower arbitration module 121, 122, 123, 124 and upper arbitration module 125, 126.

Comparing the lower arbitration modules 121, 122, 123, and 124 with the upper arbitration modules 125 an 126, the lower arbitration modules 121, 122, 123, and 124 select one of six output ports, and the upper arbitration modules 125 an 126 select one of four output ports because they output to only upper port. In the arbitration request signal (e.g., in case of the lower arbitration module 0, Arb_req00~50) inputted to each of the arbitration modules, front numbers (0-5) represent input port information, and rear number 0 represents output port information. In other words, the arbitration module determines an output priority by classifying data according to the output port.

Figure 14:
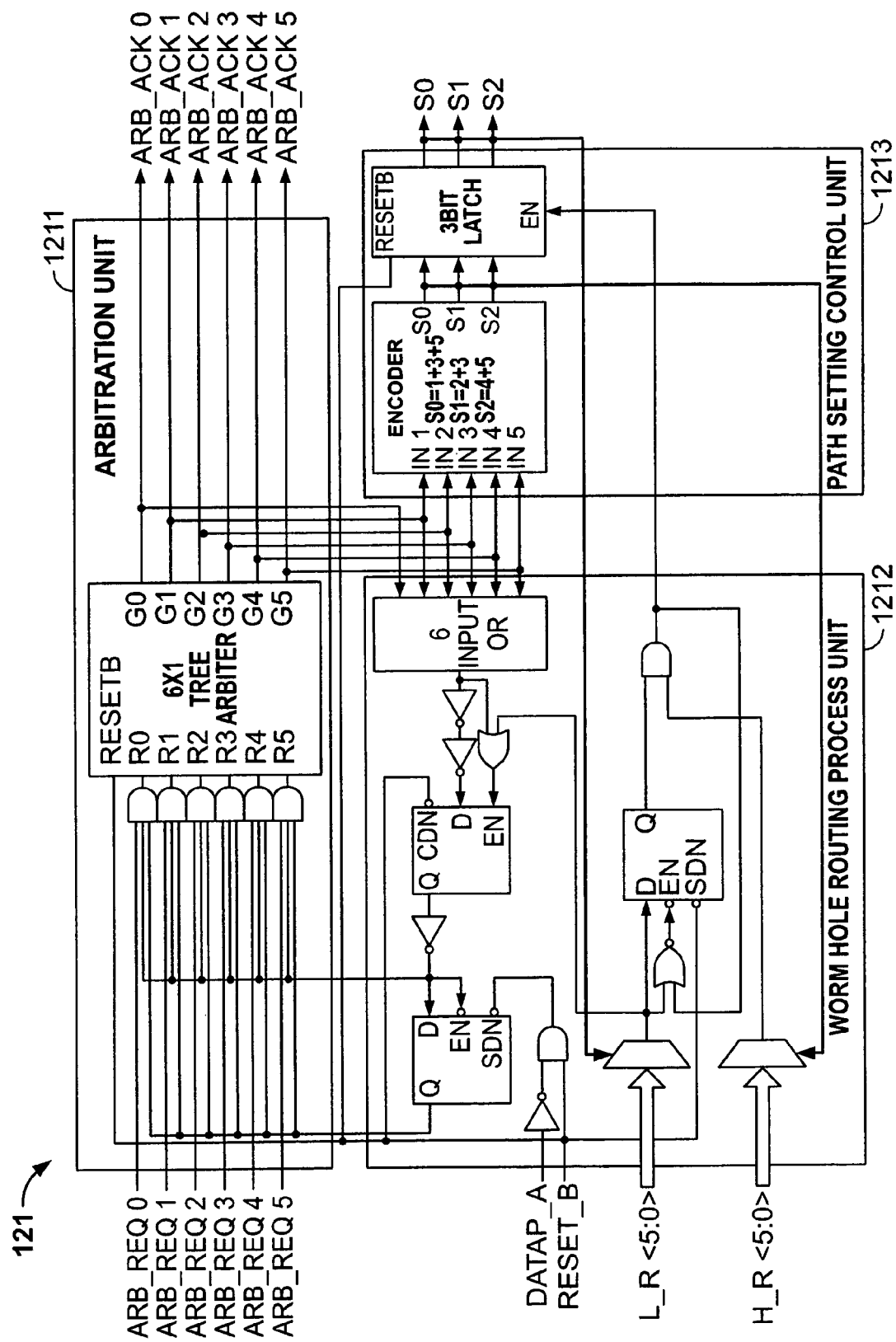
FIG. 14 is a detail construction diagram of a lower arbitration module shown in FIG. 13.
Figure 15:
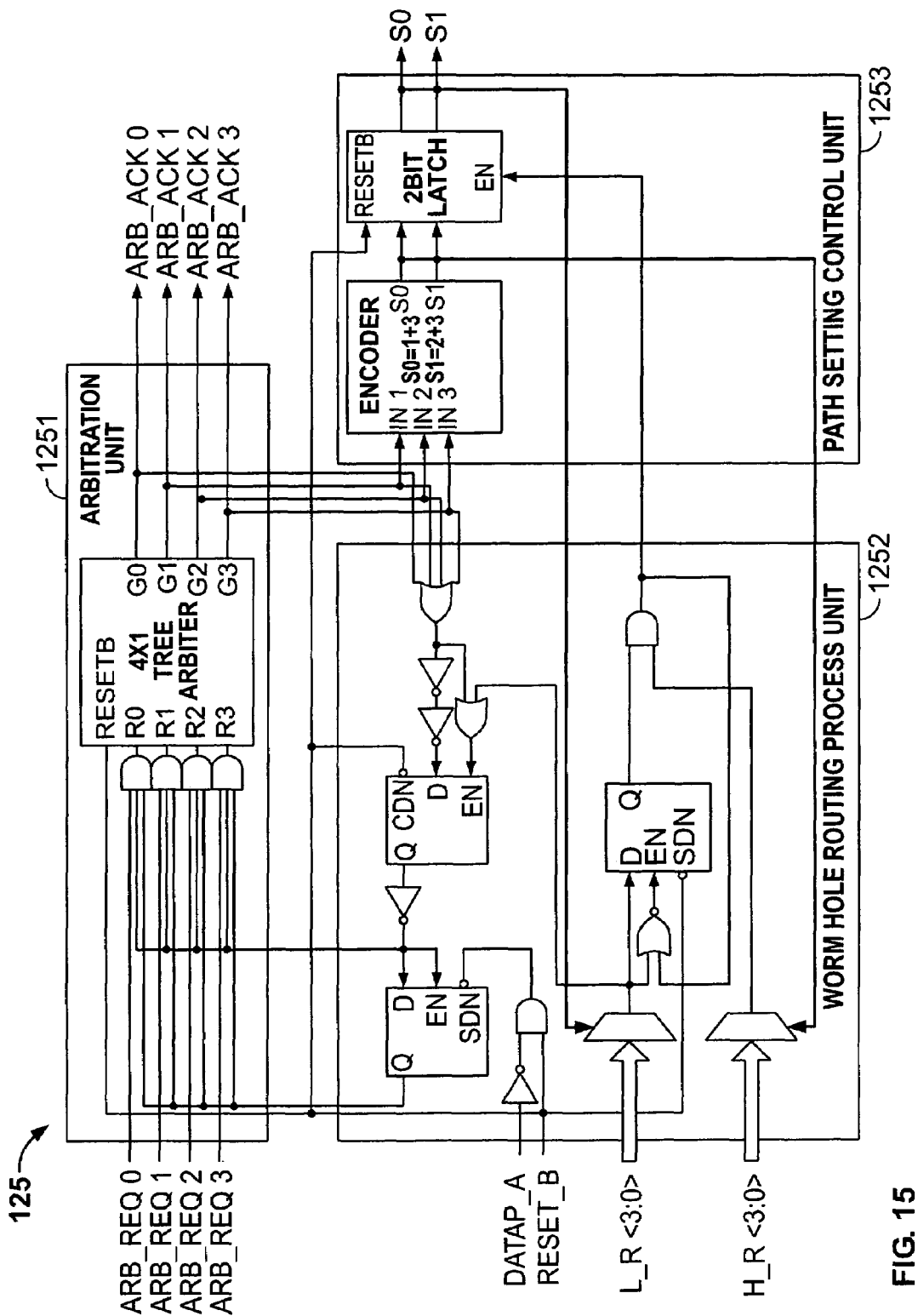
FIG. 15 is a detail construction diagram of an upper arbitration module shown in FIG. 13.

FIG. 14 is a detail construction diagram shown in FIG. 13, and FIG. 15 is a detail construction diagram of the upper arbitration module shown in FIG. 13. The upper and lower arbitration modules are different in only the number of selectable output port and operated in the same manner.

The lower and upper arbitration modules 121 and 125 include arbitration units 1211 and 1251 including a 6-by-1 tree arbiter for selecting one of a plurality of arbitration request signals Arb_req0~Arb_req5 or $Arb_{13}$ req0~Arb_req3, that is, for selecting one of a plurality of data to be outputted to the same port; worm hole routing process units 1212 and 1252 for stopping the 6-by-1 tree arbiter to maintain pertinent output path until all pertinent data packet are transferred if he arbitration request response signal Arb_ack is activated by the arbitration unit 1211 and for outputting a multiplexer selection control signal en for controlling a multiplexer selection signal to be outputted if final payload is inputted and activates final payload process request signal L_r; path setting control units 1213 and 1253 for outputting multiplexer selection signals s0~s2 or s0~s1 according to the arbitration result of the arbitration unit 1211 and the multiplexer selection control signal (en) of the worm hole routing process units 1212 and 1252.

Figure 16:
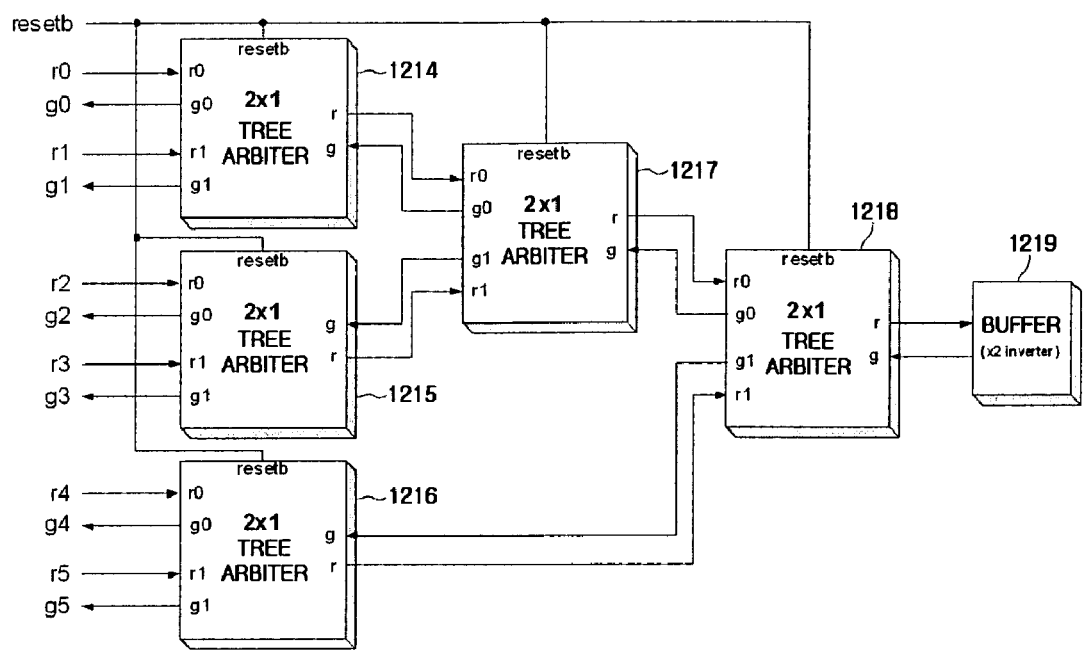
FIG. 16 is a detail construction diagram of a 6-by-1 tree arbiter shown in FIG. 14.

FIG. 16 is a detail construction of the 6-by-1 tree arbiter shown in FIG. 14.

As shown in FIG. 16, the 6-by-1 tree arbiter can be constructed by connecting a plurality of 2-by-1 tree arbiters. That is, it comprises three 2-by-1 tree arbiters 1214, 1215, and 1216 which receive two arbitration request signals respectively among six arbitration request signals and each selects one arbitration request signal; the fourth 2-by-1 tree arbiter 1217 for selecting one of output values of the first and the second 2-by-1 tree arbiters 1214 and 1215; the fifth 2-by-1 tree arbiter 1218 for selecting one of an output value of the third and the fourth 2-by-1 tree arbiters 1216 and 1217; and a buffer 1219 for temporarily storing an output value of the fifth 2-by-1 tree arbiter 1218 and outputting it.

The reset signal resetb is inputted to each 2-by-1 tree arbiter. The 2-by-1 tree arbiter receives two arbitration request signals r0 and r1 and an output node response signal g to output one arbitration request signal r and two arbitration request response signals g0 and g1.

In addition, the 4-by-1 tree arbiter applied to FIG. 15 has a similar structure as shown in FIG. 16.

That is, the 4-by-1 tree arbiter can be constructed by connecting a plurality of 2-by-1 tree arbiters. In other words, it may comprise the sixth and the seventh 2-by-1 tree arbiters which receive two arbitration request signals respectively of four arbitration request signals and each selects one arbitration request signal; the eighth 2-by-1 tree arbiter which selects one of an output values of the sixth and the seventh 2-by-1 tree arbiters; and a buffer for temporarily storing the output value of the eighth 2-by-1 tree arbiter.

Figure 17:
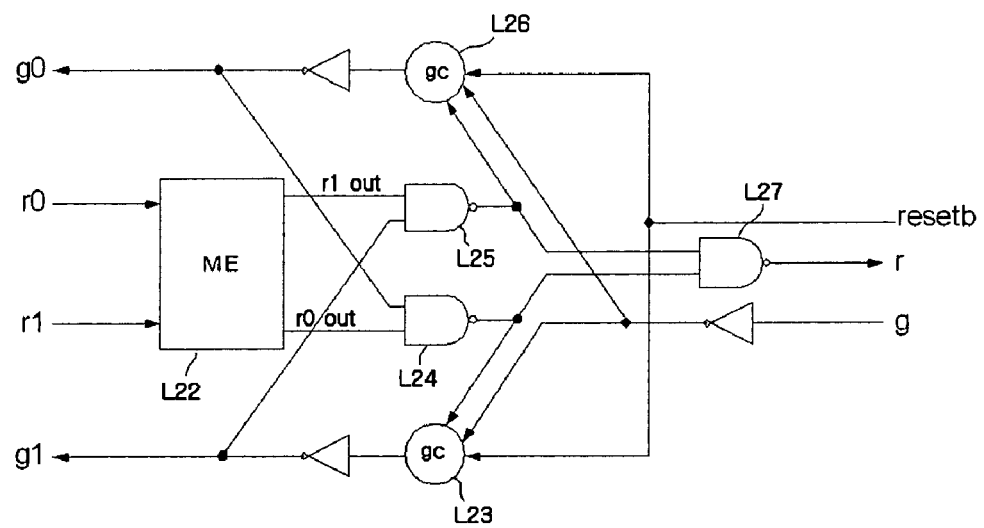
FIG. 17 is a detail construction diagram of 2-by-1 tree arbiter shown in FIG. 16.

FIG. 17 is a detail construction diagram of the 2-by-1 tree arbiter shown in FIG. 16 and an example for selecting one of two arbitration signals r0 and r1 is shown.

Figure 18:
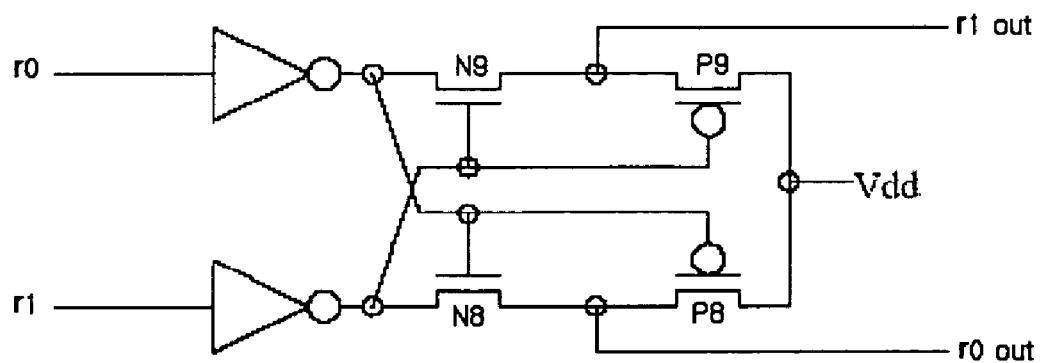
FIG. 18 is a detail construction diagram of a ME circuit shown in FIG. 17.

In advance, a ME circuit L22, which selects one signal out of two signals inputted at the same time and selects the rest of signals if the selected signal becomes low, is described referring to FIG. 18.

As shown in FIG. 18, the ME circuit L22 is driven by a signal inverted from the first input signal r0. The ME circuit L22 includes the eighth N-type transistor N8 for receiving the inverted the second input signal r1; the eighth P-type transistor P8 serially connected to the eighth N-type transistor N8 and driven by the inverted the first input signal r0; the ninth N-type transistor N9, driven by the inverted the second input signal r1, and for receiving the inverted the first input signal r0; and the ninth P-type transistor P9 serially connected between the ninth N-type transistor N9 and the eighth P-type transistor P8 and driven by the signal inverted the second input signal r1. An output of the eighth N-type transistor N8 becomes the first output signal g0, and an output of the ninth N-type transistor N9 becomes the second output signal g1.

In this Me circuit L22, if the first input signal r0 is "1" and the second input signal r1 is "0", the eighth N-type transistor N8 and the ninth P-type transistor P9 are turned off, and the ninth N-type transistor N9 and the eighth P-type transistor P8 are turned on. As a result, the first output signal g0 becomes "1", and the second output signal g1 becomes "0". In other words, if the first input signal is "1", and the second input signal "0", the first signal is selected.

Referring to this ME circuit L22, the construction and operation of the 2-by-1 tree arbiter of FIG. 17 will be described hereinafter.

As shown in FIG. 17, as two arbitration request signals r0 and r1 are inputted to the ME circuit L22, the ME circuit L22 selects one of the first output signal r0out and the second output signal r1out and then outputs it. The twenty-third logic element L23 receives the reset signal resetb, an inverse value of an output node response signal g and an output signal of the twenty-fourth logic element L24 as inputs. Then, if previous two input values are "0", the twenty-third logic element L23 outputs "0". If one of the input values is "0", the twenty-third logic element L23 continuously outputs "0". If all input values are "1", the twenty-third logic element L23 continuously outputs "1". If one of the input values is "1", the twenty-third logic element L23 continuously outputs "1". The signal g is a response signal transferred from an output signal receiving node of the 2-by-1 tree arbiter. If this signal is inputted as "1", an output signal of the twenty-third logic element L23 becomes "0". An inverse signal of this signal, that is, the second arbitration request response signal g1 becomes "1". Therefore, the twenty-fifth logic element L25 for receiving the second output signal r1out and the second arbitration request response signal g1 and inputs, and outputs "1".

In the meantime, the twenty-sixth logic element L26 for receiving inverse value of output node response signal g and output signal of the twenty-fifth logic element L25 as inputs, and outputs "0". And an inverse signal of this signal, that is, the first arbitration request response signal g0 becomes "1". Therefore, the twenty-fourth logic element L24 for receiving the first arbitration request response signal g0 and the first output signal r0 out of ME circuit L22 as inputs and outputs "0".

In addition, the output value r of the twenty-seventh logic element L27 for receiving the output signals of the twenty-fourth and the twenty-fifth logic elements L24 and L25 as inputs becomes "1". That is, the first input signal r0 is selected.

In FIG. 17, the twenty-third and the twenty-sixth logic elements L23 and L26 are the above-mentioned C-element devices. The twenty-fourth, the twenty-fifth and the twenty-seventh logic elements L24, L25, and L27 output "0" if two inputs are "1". These elements can be embodied with a NAND gate.

Now, a detail construction and the operation of data transmission path setting unit 130 will be described hereinafter.

Figure 19:
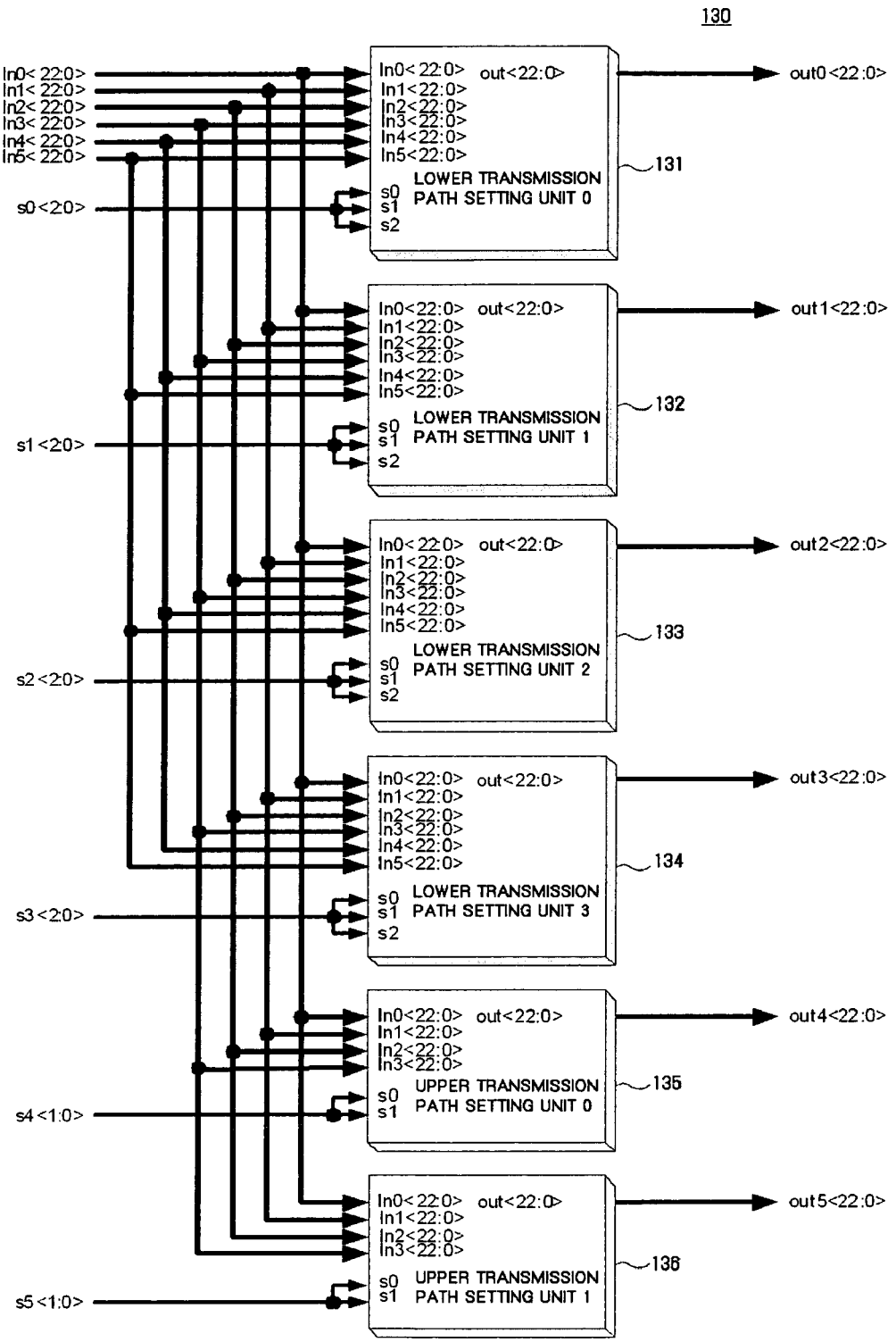
FIG. 19 is a detail construction diagram of a data transmission path setting unit applied to the present invention.

FIG. 19 is a detail construction diagram of the data transmission path setting unit applied to the present invention.

The data transmission path setting unit 130 receives 23-bit data from the data input unit 110 and output port information (an output port selection signal) from the output port arbitration unit 120 and transfers data to pertinent output port. As shown in FIG. 19, the data transmission path setting unit 130 is structured by four lower transmission path setting units 131, 132, 133, and 134, and two upper transmission path setting units 135 and 136.

Six numbers of data (In0<22:0>~In5<22:0>), 23-bit each, are inputted to the lower transmission path setting units 131, 132, 133, and 134. Four numbers of data (In0<22:0>~In3<22:0>), 23-bit each, are inputted to the upper transmission path setting units 135 and 136, because the lower transmission path setting unit can transfer data to one of six output ports, and the upper transmission path setting unit can transfer data to one of four upper output ports.

Each of transmission path setting units 131-136 receives data and refers to selection signals (s0<2:0>~s3<2:0>, s4<1:0>, and s5<1:0>) to transfer specific data to an output port identified by the selection signals (out0<22:0>~out5<22:0>) from transferred output port arbitration unit 120.

Figure 20A:
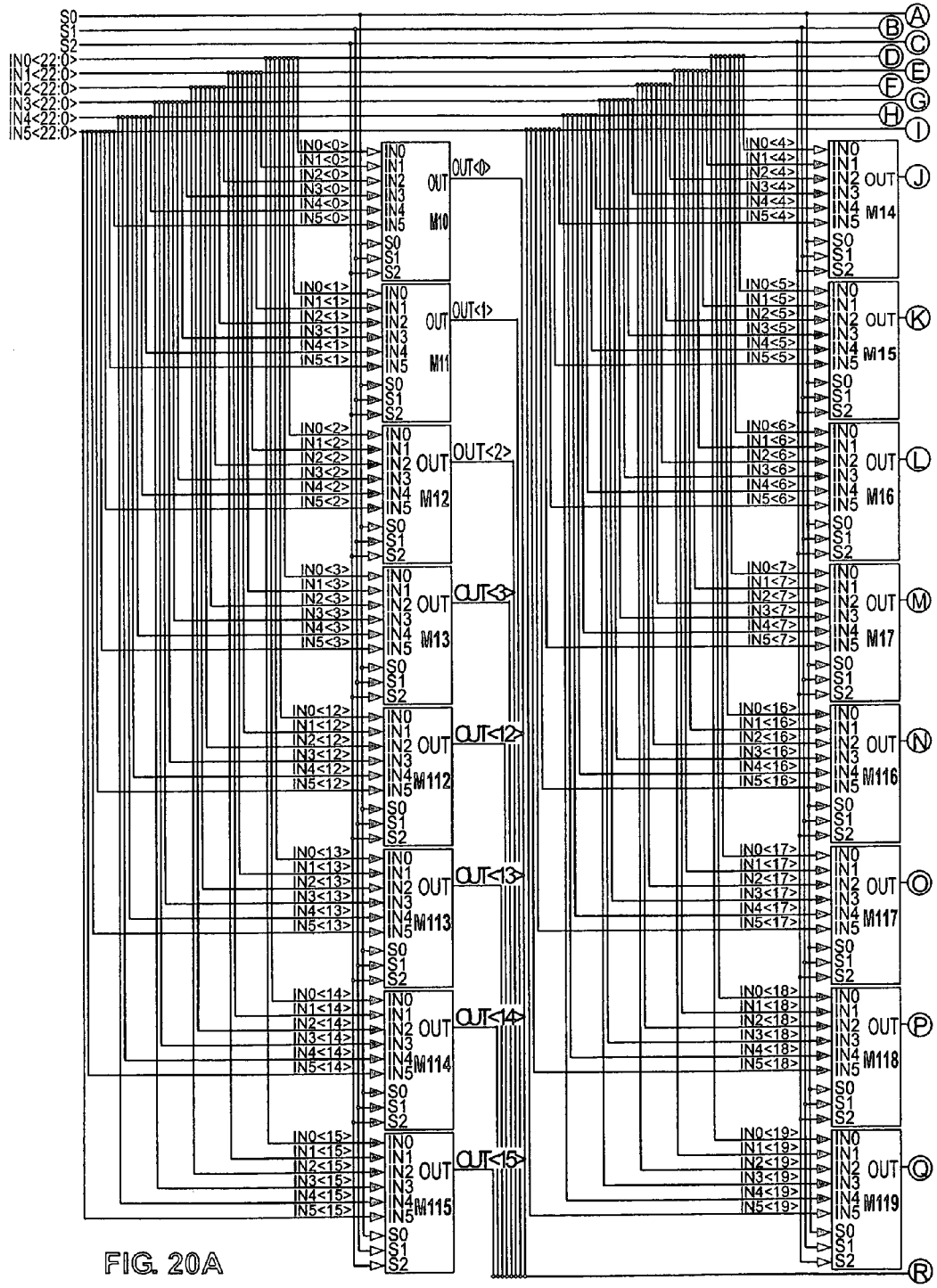
FIGS. 20A-20B are a detail construction diagram of a lower transmission path setting unit shown in FIG. 19.
Figure 20B:
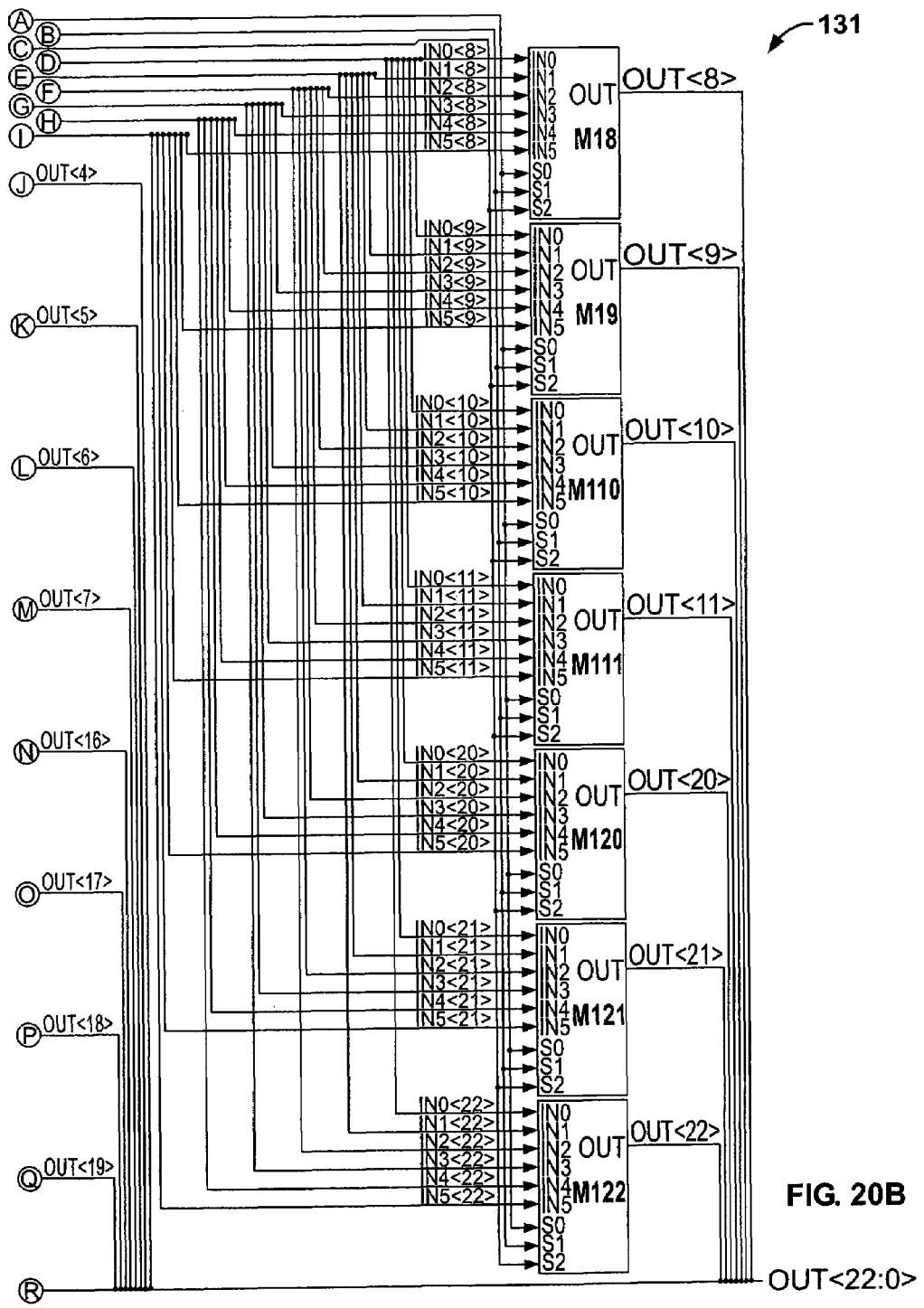
Figure 21A:
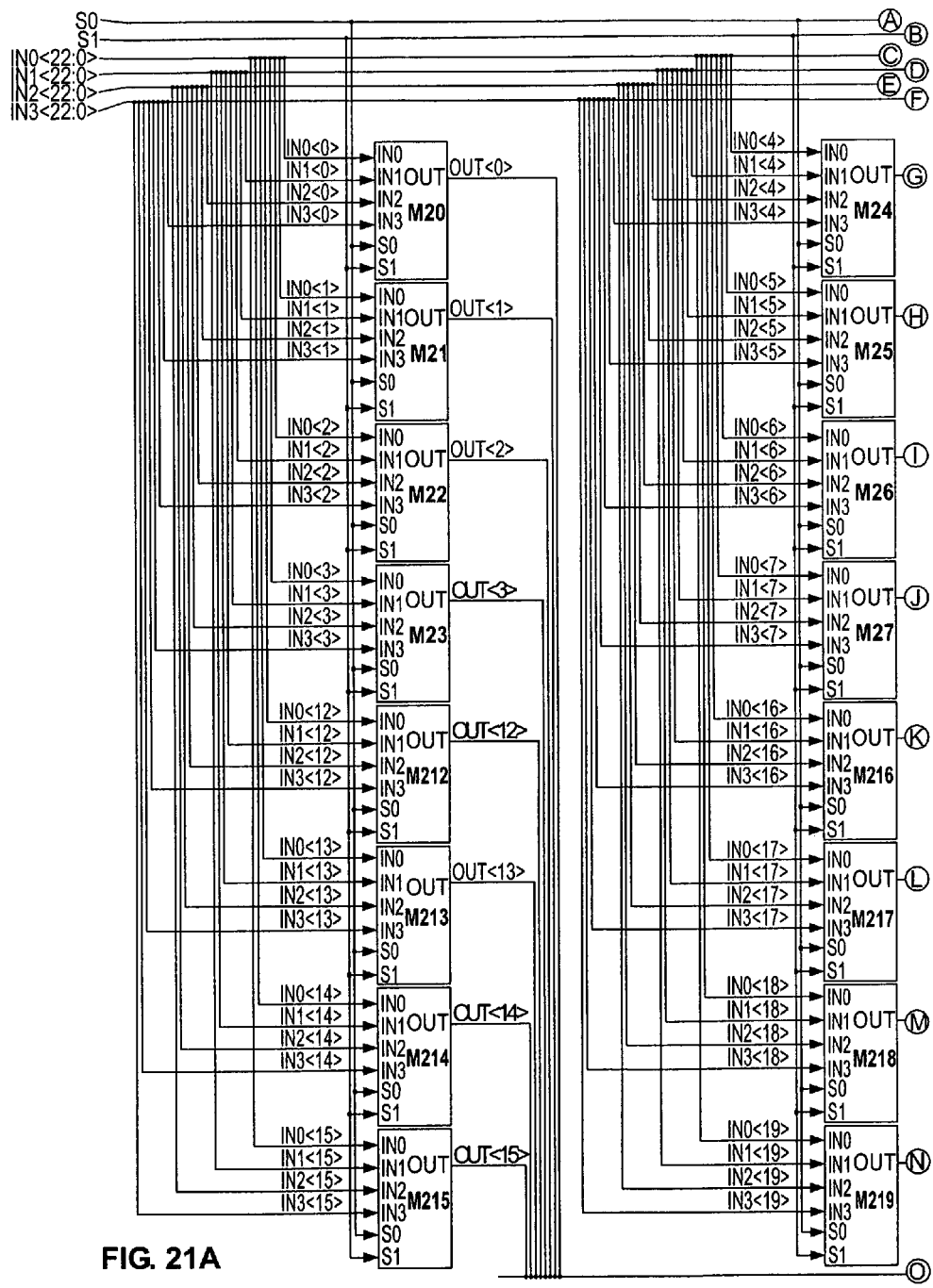
FIGS. 21A-21B a detail construction diagram of an upper transmission path setting unit shown in FIG. 19.
Figure 21B:
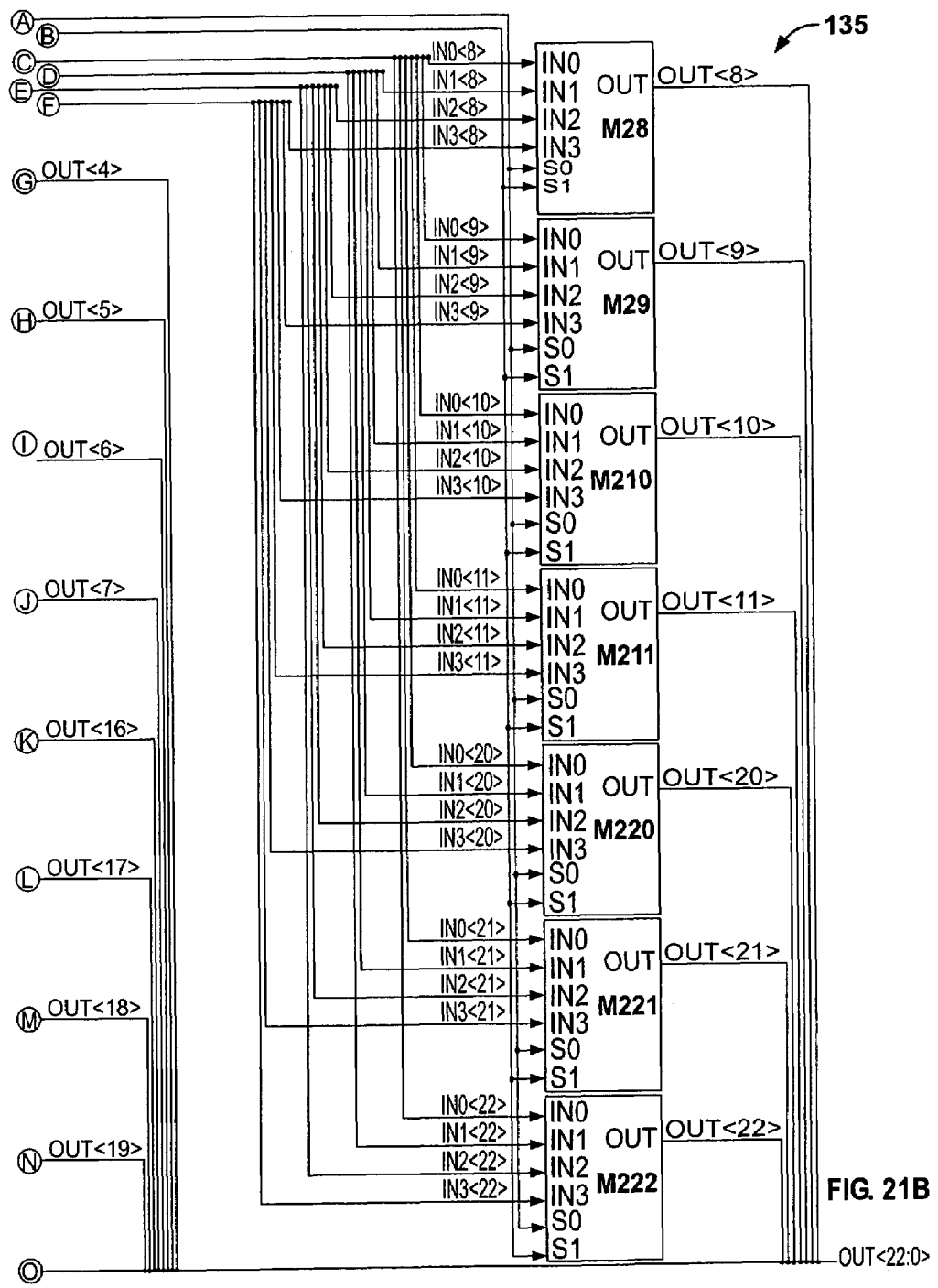

FIGS. 20A-20B are a detail construction diagram of the lower transmission path setting unit shown in FIG. 19. FIGS. 21A-21B are is a detail construction diagram of the upper transmission path unit shown in FIG. 19. The upper and lower transmission path setting units have almost the same construction except for the number of inputted data and selection signal.

23-bit data bit value which forms one data flit is inputted to twenty-three multiplexers (multiplexer 10~multiplexer 122), 1-bit for each. Six data flits are inputted to the lower transmission setting units 131, 132, 133, and 134. For example, $0^{th}$ bit data value In0<0> of the first data, $0^{th}$ bit data value In<0> of the second data, . . . $0^{th}$ bit data value In5<0> of the sixth data are inputted to the multiplexer 10. In addition, four numbers of data are inputted to the upper transmission path units 135 and 136. For instance, $0^{th}$ bit data value In0<0> of the first data, $0^{th}$ bit data value In<0> of the second data, . . . $0^{th}$ bit data value In3<0> of the fourth data are inputted to the multiplexer 20.

Furthermore, the selection signal s is inputted to each of the multiplexers M10~M122 and M20~M222. Threes selection signals s0, s1, and s2 are inputted to the lower transmission path setting units 131, 132, 133, and 134 to show six numbers of output ports. Two selection signals s0 and s2 are inputted to the upper transmission path setting units 135 and 136 to show four output ports.

Each of the multiplexers M10~M122 and M20~M222, which has received data and the selection signal, selects one of six input data to output it according to the control of the selection signal s in case of the lower transmission path setting units 131, 132, 133, and 134. In case of the upper transmission path setting units 135 and 136, each of the multiplexers M10~M122 and M20~M222 selects one of four input data to output it. This 23-bit output data out<22:0> is transferred to the data output unit 140.

Since the selection signals is previously set in the output port arbitration unit 120, the data bit column of the same data flit is transferred to the data output unit 140. Each of the bit columns is selected in each of the multiplexers and transferred so that data transmission speed is improved.

Each of the multiplexers M10~M122 can be embodied by a 6-by-1 TG (Transmission Gate) multiplexers so as to select one signal among six input signals according to the control of the selection signal in the lower transmission path setting unit 131, 132, 133, and 134. The multiplexers M20~M222 for applying the upper transmission setting units 135 and 136 can be embodied by a 4-by-1 TG multiplexer. These are described referring to FIGS. 22 and 23 hereinafter.

Figure 22:
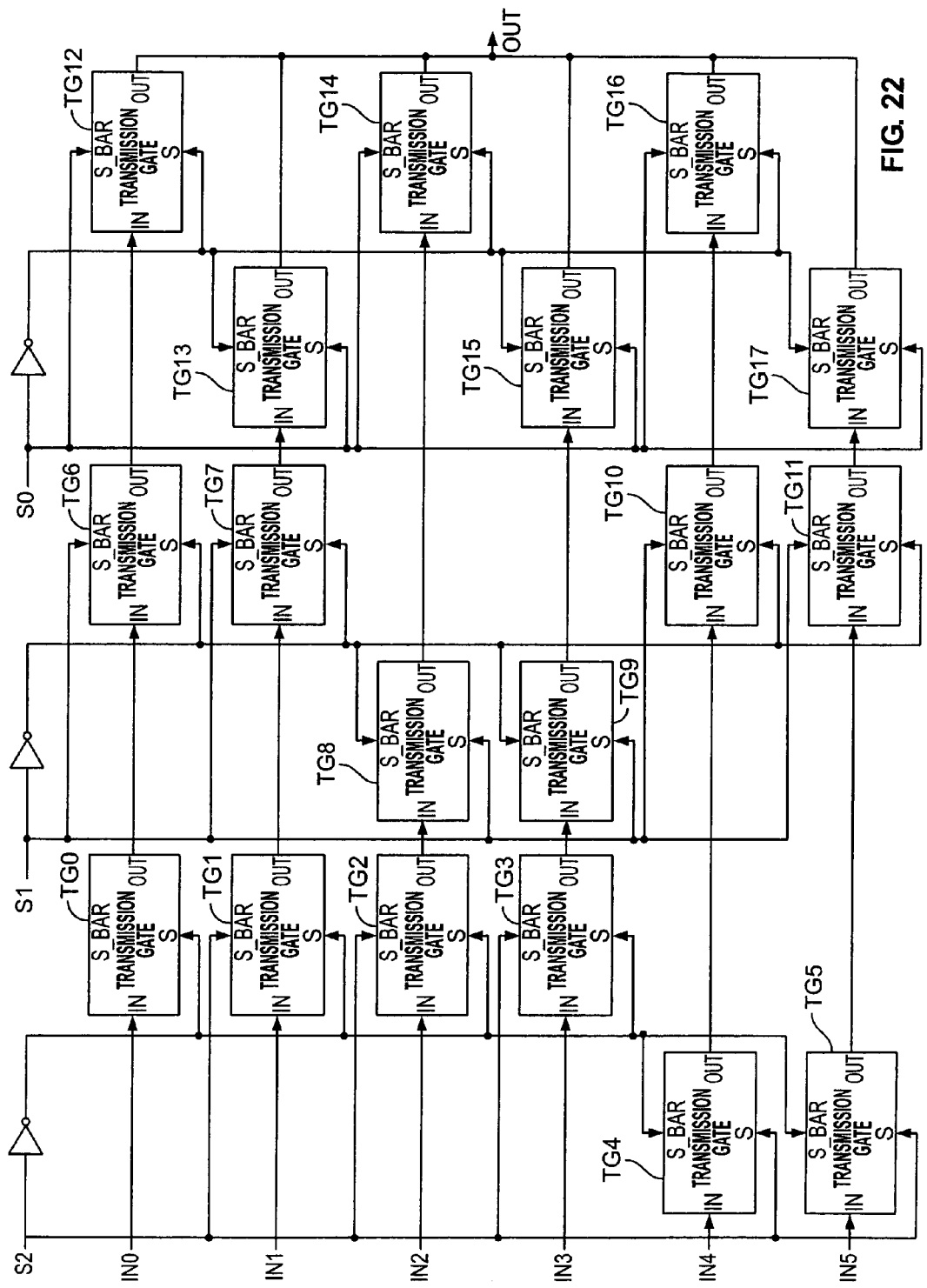
FIG. 22 is a detail construction diagram of a 6-by-1 TG MUX shown in FIGS. 20A-20B.

FIG. 22 is a detail construction diagram of the 6-by-1 TG multiplexer shown in FIGS. 20A-20B.

As shown in FIG. 22, the 6-by-1 TG multiplexer includes the first to the sixth transmission gates TG0~TG5 which receive each of the data bits in0~in5 and are controlled by the third selection signal s2 and an inverse signal of the third selection signal s2; the seventh to the twelfth transmission gates TG6~TG11 which respectively receive output signals of the first to the sixth transmission gates TG0~TG5 as inputs signals and are controlled by the second selection signal s1 and an inverse signal of the second selection signal s1; and the thirteenth to the eighteenth transmission gates TG12~TG17 which receive the seventh to the twelfth transmission gates as inputs signals and are controlled by the first selection signal s0 and an inverse signal of the first selection signal s0 to output one of input data in0~in5.

Figure 23:
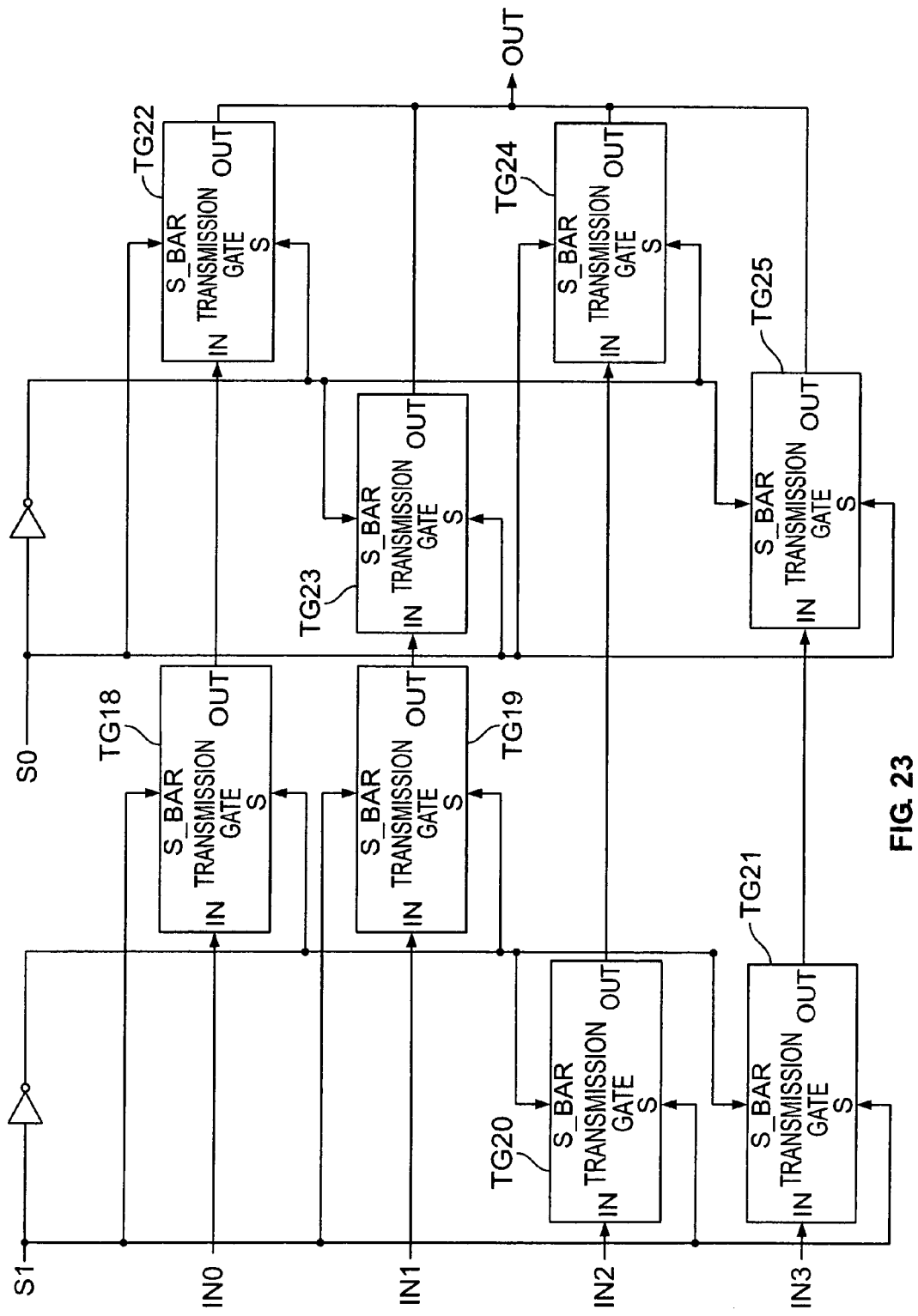
FIG. 23 is a detail construction diagram of a 4-by-1 TG MUX shown in FIGS. 21A-21B.

Meanwhile, the 4-by-1 TG multiplexer of FIG. 23 comprises the nineteenth to the twenty-second transmission gates TG18~TG21 which receive each of data bits in0~in3 and are controlled by the second selection signal s1 and an inverse signal of the second selection signal s1; and the twenty-third to the twenty-sixth transmission gates TG22~TG25 which receive output signals of the nineteenth to the twenty-second transmission gates TG18~TG21 as inputs signals and are controlled by the first selection signal s0 and an inverse signal of the first selection signal s0 to output one of input data in0~in5.

Like this, the data transmission path setting unit 130 performs a function of transferring input data to the data output unit 140 accurately according to output port information generated from the output port arbitration unit 120.

Next, the data output unit 140 applied to the asynchronous switch according to the present invention will be more fully described.

Figure 24:
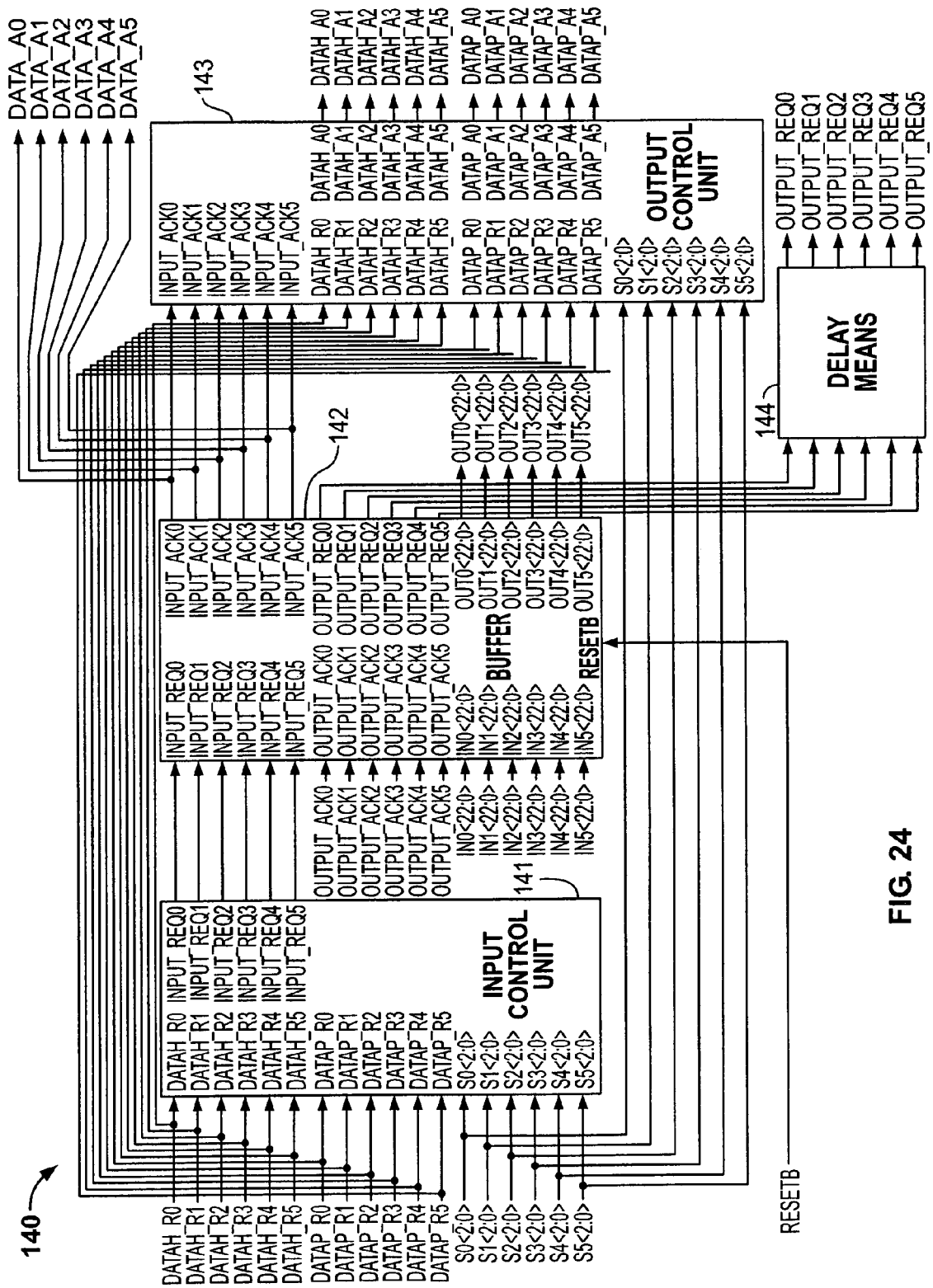
FIG. 24 is a detail construction diagram of a data output unit applied to the present invention.

FIG. 24 is a detail construction diagram of the data output unit applied to the present invention.

The data output unit 140 includes an input control unit 141, a buffer 142, and an output control unit 143. The input control unit 141 receives a header storage request signal Datah_r0~Data_r5 and payload storage request signal Dtap_r0~Datap_r5 transferred from the data input unit 110, output port information inputted from the output port arbitration unit 120, that is, selection signals s0<2:0>~s5<2:0> to request to store data to pertinent output buffer. The buffer 142 receives the reset signal resetb, and stores data to the pertinent output port according to the data transmission request signal input_req transferred from input control unit 141 and input data in0<22:0>~in5<22:0> transferred from the data input unit 110, transfers the data transmission request response signal input_ack to the output port arbitration unit 120 if data is stored completely, outputs the output request signal output_req informing a switch of next node that there is data to be outputted, and outputs out<22:0>~out5<22:0> data to the switch of next node through a designated output port if the switch of next node responses output_ack. The output control unit 143 receives the data transmission request signal input_ack0~inpu_ack5 from the buffer, the header storage request signals Datah_r0~Data_r5 and the payload storage request signals Datap_r0~Datap_r5 from the data input unit 110, and output port information s0<2:0>~s5<2:0> inputted from the output port arbitration unit 120 to transfer the header storage completion signals Datah_a0~Data_a5 and the payload storage completion signals Datap_a0~Datap_a5 to the data input unit 110.

In this case, the data output unit 140 may include delay means 144 for delaying output request signals output_req0~output_req5 outputted from the buffer 142 for predetermined time and outputting it to the switch of next node. This delay means 144 is used to maintain proper timing in transferring a signal because the switch circuit of the present invention is an asynchronous switch.

Figure 25:
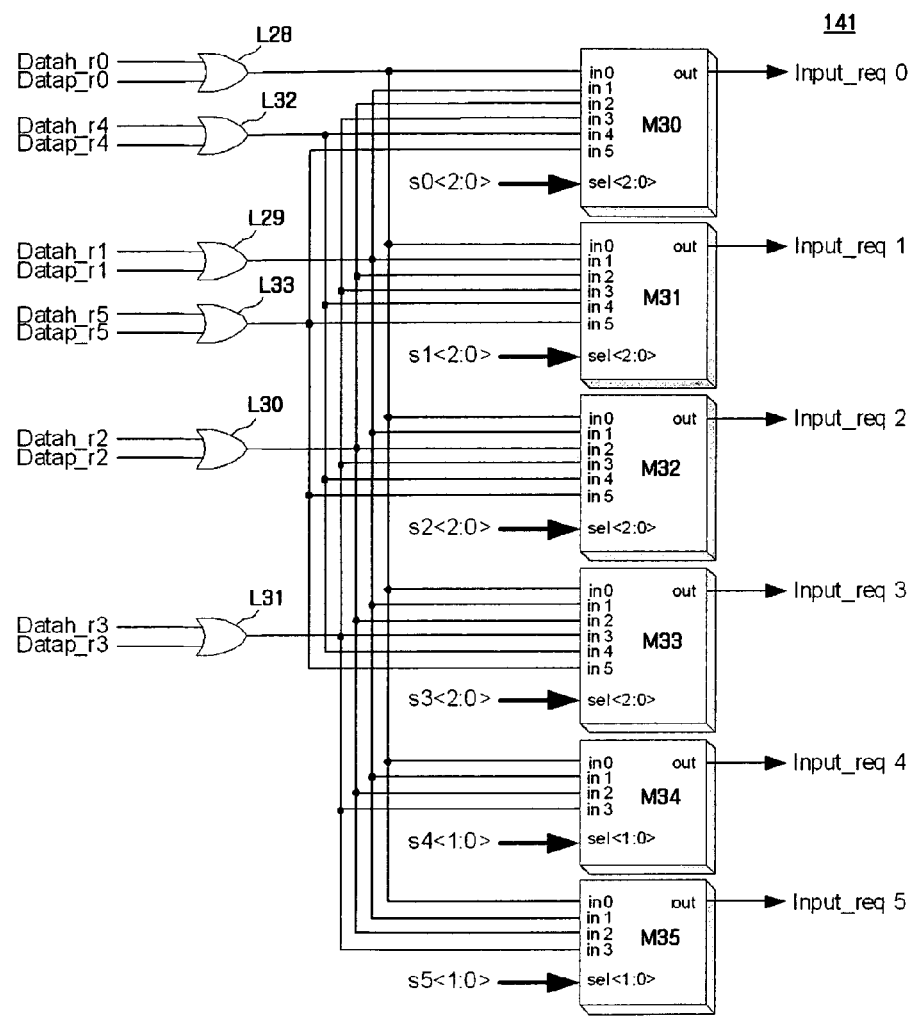
FIG. 25 is a detail construction diagram of an input control unit shown in FIG. 24.

FIG. 25 is a detail construction diagram of the input control unit shown in FIG. 24.

As shown in FIG. 25, the input control unit can be embodied by the seventh to the twelfth multiplexers M30~M35 for receiving, as inputs, the output signals of the twenty-eighth to thirty-third logic elements L28~L33 which receive the header storage completion signal and the payload storage completion signal with respect to each data and output "1" if one of input signals is "1". Selection signals s0<2:0>~s5<2:0> are inputted to the each of the multiplexers M30~M35. As a result, one of the data transmission request signals Input_req0~Input_req5 is activated by a control of the selection signals s0<2:0>~s5<2:0>.

In this case, each of the multiplexers M30~M35 can be embodied by the 6-by-1 TG multiplexers. Concrete example is shown in FIG. 22. Moreover, the twenty-eighth to thirty-third logic elements L28~L33 can be embodied by an OR gate because it is unnecessary that the date output unit 140 tells whether the data inputted to the input control unit 141 is header or payload.

Figure 26:
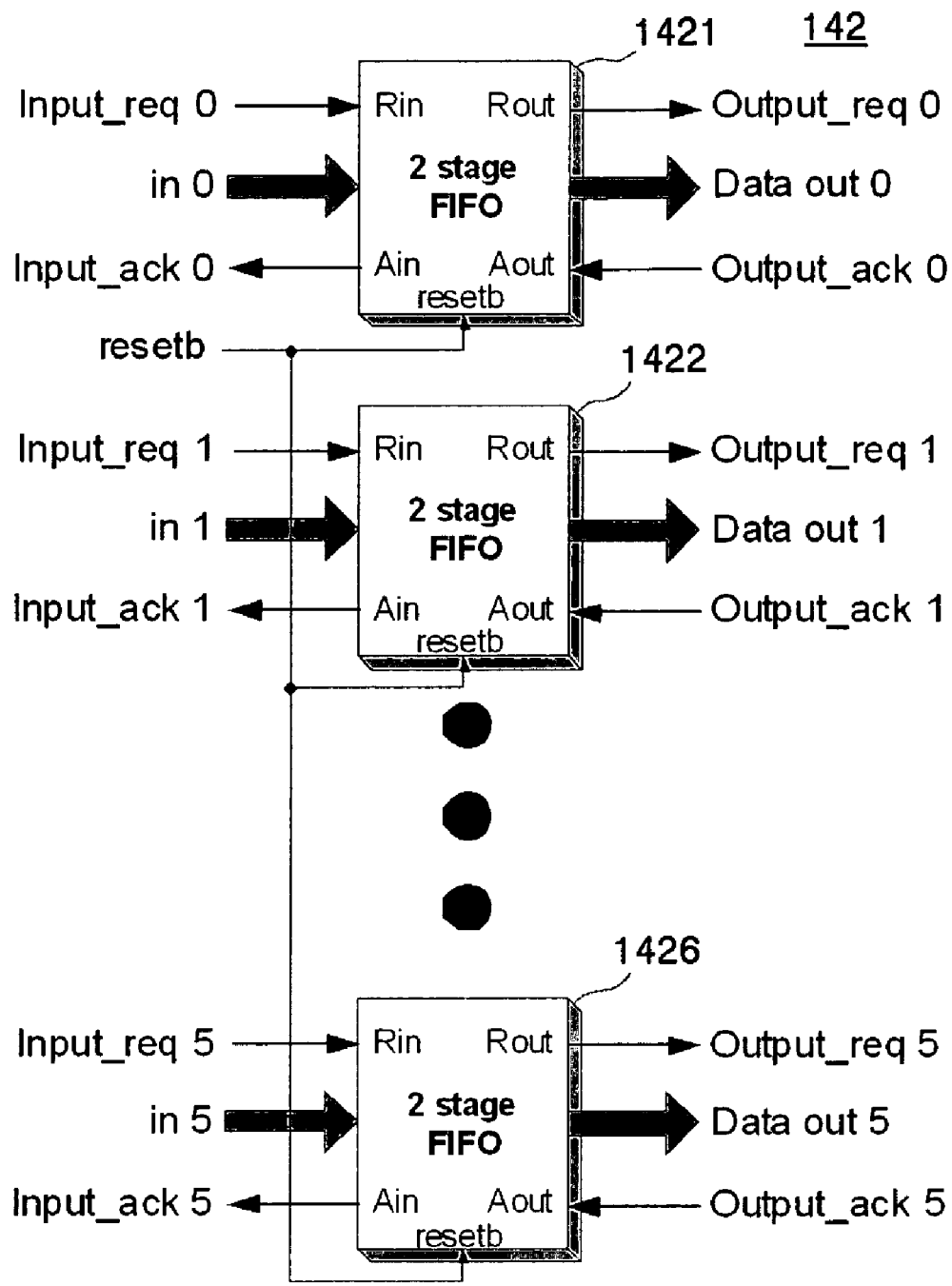
FIG. 26 is a detail construction diagram of a buffer shown in FIG. 24.

FIG. 26 is a detail construction diagram of the buffer.

The buffer 142 according to the present invention can be used by connecting six numbers of two-stage first-in first-out buffers (FIFO 1421~1426) in parallel.

The reset signal resetb is inputted to each of two-stage FIFO buffer. Data is stored in pertinent output port according to input data (in) transferred from the data input unit 110 and the data transmission request signal input_req inputted from the input control unit 141. If data is stored completely, the data transmission request response signal input_ack is transferred to the output port arbitration unit 120.

Moreover, the output request signal output_req informing data to be outputted into a switch of next node is outputted. According to the response output_ack of next switch, data is outputted (out)to the switch of next node through designated output port.

Figure 27:
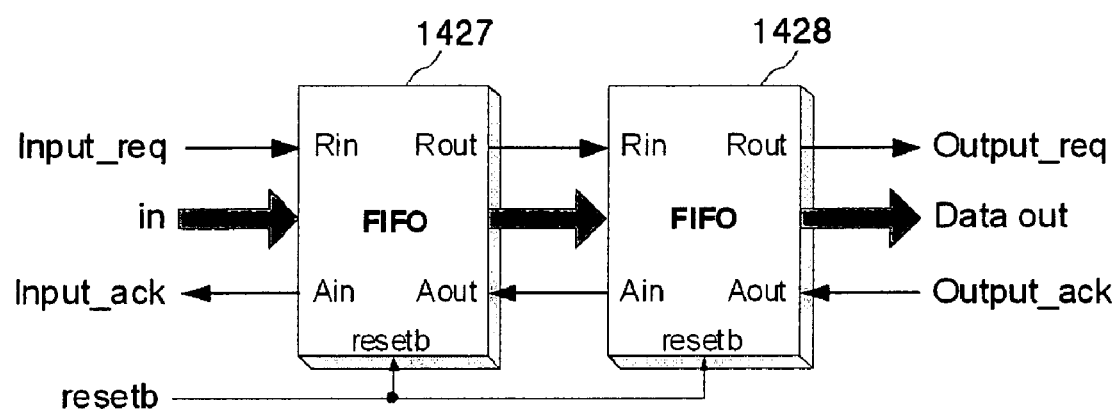
FIG. 27 is a detail construction diagram of a two-stage first-in first out buffer shown in FIG. 26.

FIG. 27 is a detail construction of two-stage FIFO buffer. This two-stage FIFO buffer can be embodied by serially connecting two numbers of semi-decoupled first-in first-out buffers 1427 and 1428.

Figure 28:
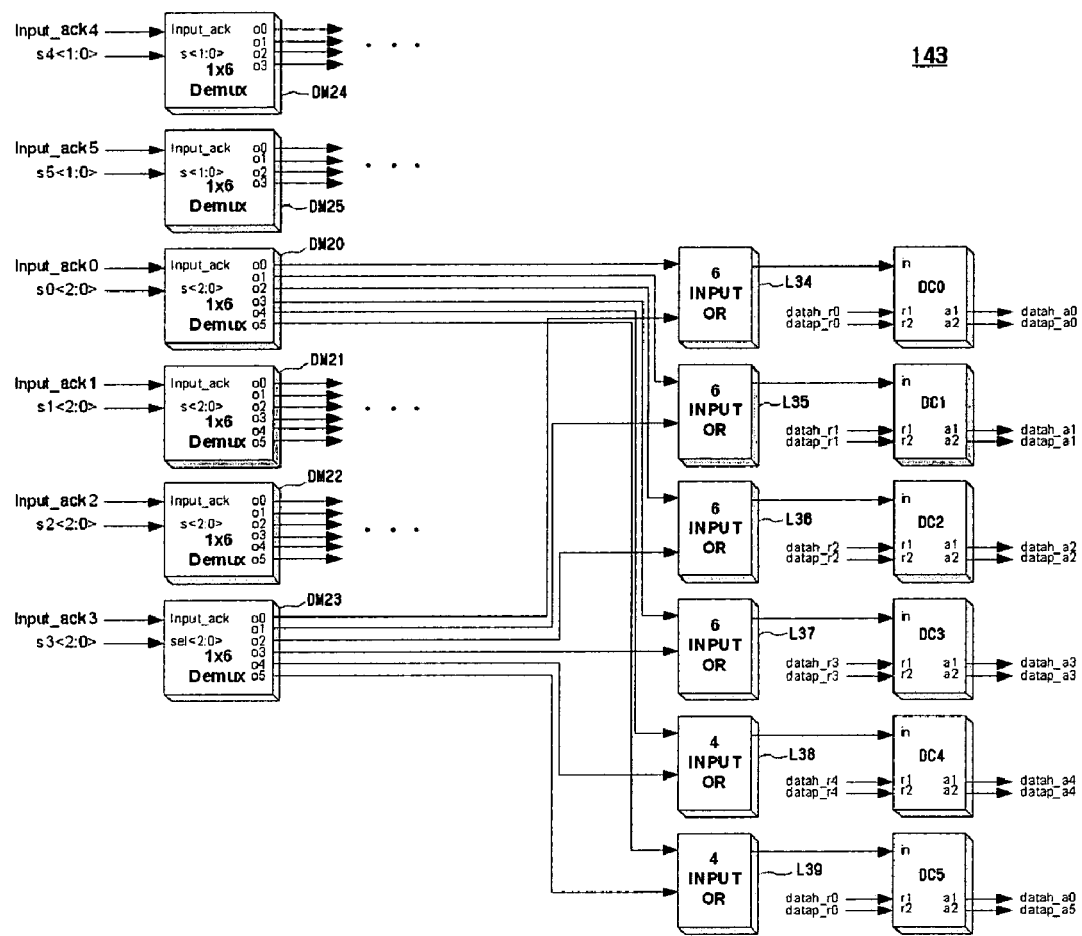
FIG. 28 is a detail construction diagram of an output control unit shown in FIG. 24.

FIG. 28 is a detail construction diagram of the output control unit shown in FIG. 24.

As shown in FIG. 28, the output control unit 143 comprises the first to the fourth de-multiplexers DM20~DM23 for respectively receiving the data transmission request signal input_ack inputted from the buffer 142 and the selection signals s0~s5 inputted from the output port arbitration unit 120 to generate a control signal for data to be outputted to the lower output port; the fifth and the sixth de-multiplexers DM24~DM25 for generating a control signal for the data to be outputted to the upper output port; the thirty-fourth to the thirty-ninth logic elements L34~L39 which respectively receive output values of the first to the sixth de-multiplexers DM24~DM25 each output port number and output "1" if one of input signals is "1"; and the first to the sixth decoders DC0~DC5 which receive the output values of the thirty-fourth to the thirty-ninth logic elements L34~L39 as input values and transfer the header storage request signal Datah_r and payload storage request signal Datap_r inputted from the data input unit 110 according to each of output port number, the header storage completion signal Datah_a and payload storage completion signal Datap_a informing that data is stored in the buffer 142 to the data input unit 110.

FIG. 28 shows only signal line for outputting data inputted to the first input port and to the fourth input port. However, the same signal line with respect to another input data can be shown in the same manner.

Furthermore, the switch circuit of the present invention may further include delay units 150 and 160 between the data input unit 110 and the output port arbitration unit 120, and between the data input unit 110 and the data output unit 140. This is for controlling timing because the switch circuit of the present invention is an asynchronous switch.

The delay unit can be embodied in a buffer-chain shape formed by serially connecting a plurality of buffers between the input node and the output node. In specifically, the delay unit 150 connected between the data input unit 110 and the output port arbitration unit 120 is used to delay the header flit process request signal H_r transferred from the data input unit 110 to the output port arbitration unit 120. In other words, the delay unit 150 is used so as to more rapidly output routing information rib rather than the header flit request signal H_r.

In the meanwhile, the delay unit 160 connected between the data input unit 110 and the data output unit 140 is used in order to delay the header storage request signal Datah_r. In addition, the delay unit 160 is used to synchronize a data transmission time which header storage request signal Datah_r transmitted from transmission path setting unit 130 to the data output unit 140.

As previously mentioned, various IPs are embodied in one chip. A switch circuit making communications between IPs possible is embodied by a topology of a butterfly fat-tree. Data is transferred by worm hole switch technique. As a result, there are advantages in that data processing speed in a network-on-chip is improved, and the construction becomes simple.

Although the present invention has been described in connection with the embodiment of the present invention illustrated in the accompanying drawings, it is not limited thereto. It will be apparent to those skilled in the art that various substitution, modifications and changes may be thereto without departing from the scope and spirit of the invention.

What is claimed is:

1. An asynchronous switch for network on chip applications to transfer a plurality of data packets, wherein the data packet is constructed with one header flit and at least one payload flit, the asynchronous switch comprising:
a data input unit for receiving and storing a plurality of data flits, and confirming whether a data flit is the one header flit or the at least one payload flit according to a transmission request signal;
an output port arbitration unit for outputting an output port selection signal showing an output priority on receiving a header flit request signal, a final payload flit process request signal, routing information of the header flit, and an arbitration request signal from the data input unit;
a data transmission path setting unit for sequentially storing the data flit according to the output priority determined by the output port arbitration unit; and
a data output unit which receives a header storage request signal and a payload storage request signal from the data input unit, temporarily stores the data flit inputted from the data transmission path setting unit, transfers header and payload storage completion signals indicating that the data flit is stored to the data input unit, and outputting the temporarily stored data flit to a designated port according to a pre-set order;
a plurality of input ports and a plurality of output ports, which are constructed with a plurality of lower ports and a plurality of upper ports respectively, and
wherein the output port arbitration unit comprises a plurality of lower arbitration modules for processing a data flit outputted to a lower output port or an upper output port, and a plurality of upper arbitration modules for processing a data flit outputted to an upper output port,
wherein the upper and lower arbitration modules comprise:
an arbitration unit for selecting one of a plurality of data to be outputted to the same output port and outputting a response signal in response to the arbitration request signal;
a worm hole routing process unit which maintains a pertinent output path until one data packet is outputted to the data output unit, and outputs a control signal for outputting an output port selection signal if a final payload flit process request signal is inputted from the data input unit; and
a path setting control unit for outputting the output port selection signal according to a control signal outputted of the worm hole routing process unit and an arbitration request response signal of the arbitration unit.

2. The asynchronous switch of claim 1, wherein the asynchronous switch is constructed with six input ports and six output ports, which are respectively constructed with four lower ports and two upper ports, and
wherein the data input unit comprises:
four lower input processing modules for processing a data flit, which is outputted to a lower output port or an upper output port; and
two upper input processing modules for processing a data flit, which is outputted to the upper output port.

3. The asynchronous switch of claim 2, wherein the header flit includes a type field, a source address field and a muting information field, and
wherein the payload flit includes the type field and a payload field, and
wherein the lower and upper input processing modules comprises:
a data storage unit for temporarily storing a header flit if an inputted data flit is the header flit, fetching routing information from a routing information field included in the header flit to transfer the routing information to the output port arbitration unit, shifting the routing information to the right, and temporarily storing a payload flit if an inputted data flit is the payload flit to transfer the payload flit to the data transmission path setting unit;
a header control unit for generating a control signal to process the header flit, transferring an arbitration request signal and a shift request signal to the output port arbitration unit, transferring a header flit buffering request signal to the data storage unit and receiving a header flit buffering response signal, and transferring a header storage request signal to the data output unit and receiving a header storage completion signal; and
a payload control unit for generating a control signal for processing the payload flit, transferring a payload flit buffering request signal to the data storage unit and receiving a payload flit buffering response signal, and transferring a payload storage request signal to the data output unit and receiving a payload storage completion signal.

4. The asynchronous switch of claim 3, wherein the payload control unit comprises:
a delay element for delaying a payload process request signal for predetermined time to generate the payload flit buffering request signal;
a first logic element for receiving a payload flit buffering response signal from the data storage unit and a payload storage completion signal from the data output unit to output the payload storage request signal, outputting "0" if two input values of a previous state are "0", continuously outputting "0" if any one input value is "0", outputting "1" if all input values are "1", and continuously outputting "1" if any one input value is "1"; and
a second logic element which receives an output signal of the first logic element and the payload flit buffering response signal as input values, and outputs "1" if two input values are "1".

5. The asynchronous switch of claim 3, wherein the header control unit comprises:
a third logic element which receives the header flit process request signal and a response signal for the arbitration request as input values and outputs "1" if all input values "0";
a fourth logic element which receives an output value of the third logic element and a response signal for a header flit process request as input values, outputs "0" if two input values of previous state are "0", continuously outputs "0" if any one input value is "0", outputs "1" if all input values are "1" and continuously outputs "1" if any one input value is "1";

a fifth logic element which receives an inverse value of the output value of the fourth logic element and a response signal in respect to shift request as input values and outputs a header flit buffering flit signal, which is "1" only if two input values are "1";

an eighth logic element which receives a reset signal resetb, the first input and the second input and outputs "1" if two input values are "0", maintains an output value "1" if any one input value is "0", outputs "0" if all input values become "1", the eight logic element for maintaining an output value "0" if any one input value is "1", wherein the first input is an output value of the sixth logic element which receives an output value of the fourth logic element and an inverse value of the fifth logic element and outputs "1" if two input values are "1", and the second input is an output value of the seventh logic element which receives an inverse value of the fourth logic element and a header flit process request signal and outputs "1" if two input values are "1";

a ninth logic element which inverts the output value of the eighth logic element to output a shift request signal;

a twelfth logic element which receives the first input and the second input, wherein the first input is an output value of the tenth logic element which receives a reset signal, a header flit request signal, an inverse value of a header storage completion signal as inputs, and outputs "1" if two input values are "0" and the second input is an output value of the eleventh logic element which receives an output value of the fourth logic element an inverse value of a header flit buffering request response signal and a header flit process request signal as inputs, and outputs "1" if two input value are "1";

a thirteenth logic element which inverts an output of the twelfth logic element;

a fourteenth logic element which respectively receives a reset signal, an output value of the thirteenth logic element as the first input and a response signal with respect to an arbitration request as the second input and outputs an arbitration request signal;

a sixteenth logic element which respectively receives a reset signal and a header storage completion signal and an output value of the fifteenth logic element as the first input and the second input that is the output value of the fifteenth logic element which receives a header flit process request signal, a response signal with respect to the arbitration request signal, and an inverse value of a header storage completion signal as inputs and outputs "1" if all input values are "1"; and a seventeenth logic element which inverts an output of the sixteenth logic element to generate a header storage request signal.

6. The asynchronous switch of claim 5, wherein the four logic element comprises:
a first P-type transistor connected to a power stage and driven by the first input signal;
a second P-type transistor connected to the first P-type transistor in a series and driven by an inverse signal of the second input signal;
a first N-type transistor connected to the second P-type transistor in a series and driven by the first input signal;
a second N-type transistor connected between the first N-type transistor and a ground stage in a series and driven by an inverse signal of the second input signal;
a third P-type transistor connected between the power stage and an output stage of the second P-type transistor and driven by a reset signal; and
a delay element connected to an output stage of the second P-type transistor.

7. The asynchronous switch of claim 5, wherein the eighth, the twelfth, and the sixteenth logic elements comprise:
a fourth P-type transistor connected to the power stage and driven by the third input signal;
a fifth P-type transistor connected to the fourth P-type transistor in a series and driven by an inverse signal of the fourth input signal;
a third N-type transistor connected to the fifth P-type transistor in a series and driven by the third input signal;
a fourth N-type transistor serially connected between the third N-type transistor and the power stage and driven by an inverse signal of the fourth input signal;
a fifth N-type transistor serially connected between an output stage of the fifth P-type transistor and a ground stage and driven by an inverse signal of a reset signal; and
a delay element connected to an output stage of the fifth P-type transistor.

8. The asynchronous switch of claim 5, wherein the fourteenth logic element comprises:
a sixth P-type transistor connected to a power stage and driven by the fifth input signal;
a sixth N-type transistor connected to the sixth P-type transistor in a series and driven by an inverse signal of the fifth input signal;
a seventh N-type transistor connected between the sixth N-type transistor and a ground stage and driven by the sixth input signal;
a seventh P-type transistor connected between a power stage and an output stage of the sixth P-type transistor and driven by a reset signal; and
a delay element connected to an output stage of the sixth P-type transistor.

9. The asynchronous switch of claim 3, wherein the data storage unit comprises:
an eighteenth logic element for receiving the header flit buffering request signal and the payload flit buffering request signal to output "1" if any one of two signals is "1";
a plurality of selection means for respectively receiving a plurality of lower bit values among inputted data flits, a shift request signal, an inverse signal of the shift request signal, and a data bit value on the right of n-bit as input values;
n number of subsidiary data selection means for receiving data bit value 0, a shift request signal, an inverse signal of the shift request signal and a data bit value on the right of n-bit as input values;
a plurality of lower data storage means respectively connected to the data selection means to receive an output signal of the data selection unit and an output signal of the eighteenth logic element as input values, and then respectively stores an output value of the data selection means;
n number of subsidiary data storage means respectively connected to the subsidiary data selection means, which receive an output signal of the subsidiary data selection unit and the output signal of the eighteenth logic element as input values, and then respectively stores the output value of the subsidiary data selection means; and
a plurality of upper data storage means which receives each bit column among inputted data bits except a data bit column inputted by the data selection means as input values and respectively store the inputted data bit value.

10. The asynchronous switch of claim 9, wherein when the data flit is 23-bit, the header flit includes a type-field of 2-bit, a source address field of 6-bit, and a routing information field of 15-bit, and
wherein a payload flit includes a type-field of 2-bit and a payload field of 21-bit, and
wherein a data bit value of lower 15-bit is inputted to the data selection means, respectively.

11. The asynchronous switch of claim 9, wherein the data selection unit and the subsidiary data selection unit comprise:
the nineteenth logic element which receives a shift request signal and a data bit value as input values and outputs "1" if two signals are "1";
a twentieth logic element which receives an inverse signal of the shift request signal and a data bit value on the right of n-bit and outputs "1" if two inputs are "1"; and
a twenty-first logic element which receives output values of the nineteenth and the twentieth logic elements as input values and outputs "1" if any one of two input values is "1".

12. The asynchronous switch of claim 1, wherein each of the input ports and output ports is comprising six input ports and six output ports, which are constructed with four lower ports and two upper ports respectively, and
wherein the output part arbitration unit comprises:
four lower arbitration modules for processing a data flit outputted to a lower output port or an upper output port; and
two upper arbitration modules for processing a data flit outputted to an upper output port.

13. The asynchronous switch of claim 1, wherein the lower arbitration module is constructed with a 6-by-1 tree arbiter, and wherein the 6-by-1 tree arbiter comprises:
first to third 2-by-1 tree arbiters which receive two respectively among six arbitration request signals with respect to six data packets outputted to the same output port and each selects one of two arbitration request signals;
a fourth 2-by-1 tree arbiter for selecting one of output values of the first and the second 2-by-1 tree arbiters;
a fifth 2-by-1 tree arbiter for selecting one of output values of the third 2-by-1 tree arbiter and the fourth 2-by-1 tree arbiter; and
a buffer for temporarily storing the output value of the fifth 6-by-1 tree arbiter to output the output value.

14. The asynchronous switch of claim 1, wherein the arbitration unit of the upper arbitration module is constructed with a 4-by-1 tree arbiter, and
wherein the 4-by-1 tree arbiter comprises:
a sixth and a seventh 2-by-1 tree arbiters which receive two respectively among four arbitration request signals with respect to six data packets to be outputted to the same upper output port and each selects one of two arbitration request signals;
an eighth 2-by-1 tree arbiter for selecting one of output values of the sixth 2-by-1 tree arbiter and the seventh 2-by-1 tree arbiter; and
a buffer which temporarily stores an output value of the eighth 6-by-1 tree arbiter and then outputs the output value.

15. The asynchronous switch of claim 1, wherein the asynchronous switch is constructed with six input ports and six output ports, which are constructed with four lower ports and two upper parts respectively, and
wherein the data transmission path setting unit comprises:
four lower transmission path setting units for processing a data flit outputted to a lower output port or an upper output port; and
two upper transmission path setting units for processing a data flit outputted to an upper output port.

16. The asynchronous switch of claim 15, wherein the lower transmission path setting unit and the lower transmission path setting unit are constructed with as many multiplexers as a data bit number of one data flit, and
wherein the multiplexer receives a data bit value of 1-bit from each of a plurality of data flits inputted from the data input unit and an output port selection signal from the output port arbitration unit, and outputs a data bit designated by the output port selection signal, and then transfers the data bit to the data output unit.

17. The asynchronous switch of claim 16, wherein the multiplexer is constructed with a transmission gate multiplexer.

18. The asynchronous switch of claim 1, wherein the asynchronous switch is constructed with six input ports and six output ports, which are constructed with four lower ports and two upper ports respectively, and
wherein the data output unit comprises:
an input control unit which receives the header storage request signal and the payload storage request signal, which are transferred from the data input unit, and the output port selection signal inputted from the output port arbitration unit and then requests an output buffer, designated by the output port selection signal, to store a data flit;
a buffer which stores data to the output port according to the plurality of data flits transferred from the data input unit and a data transmission request signal inputted from the input control unit, and transfers a data storage completion signal to the output port arbitration unit if data is stored completely, and outputs an output request signal indicating that data to be outputted exists to a switch of next stage, and outputs the data flit referring to the output port selection signal according to a response of the switch of next stage to an output request signal; and
an output control unit which receives a data storage completion signal from the buffer, the header storage request signal and the payload storage request signal from the data input unit, and the output port selection signal from the output port arbitration unit, and transfers the header storage completion signal and the payload storage completion signal to the data input unit.

19. The asynchronous switch of claim 18, wherein the data output unit further comprises delay means for delaying an output request signal outputted from the buffer for predetermined time, and then outputs the output request signal to the switch of next stage.

20. The asynchronous switch of claim 18, wherein the input control unit comprises:
twenty-eighth to thirty-third logic elements which receive a header storage completion signal and a payload storage completion signal with respect to each of data flits as input values, and outputs "1" if one of input signals is "1"; and
seventh to twelfth multiplexers, respectively connected to the twenty-eighth to thirty-third logic elements, which receive output signals of the twenty-eighth to thirty-third logic elements to activate one of a data storage request signals by a control of the output port selection signal.

21. The asynchronous switch of claim 20, wherein the seventh to the twelfth multiplexers are constructed with transmission gate multiplexer.

22. The asynchronous switch of claim 18, wherein the buffer is constructed with a plurality of two-stage first-in first-out buffers, which are connected in parallel.

23. The asynchronous switch of claim 18, wherein the output control unit comprises:

first to fourth de-multiplexers which respectively receive the data storage completion signal inputted from the buffer and the output port selection signal inputted from the output port arbitration unit, and generate a control signal for data to be outputted to the a lower output port;

a fifth and a sixth de-multiplexers for generating a control signal for data to be outputted to an upper output port;

thirty-fourth to thirty-ninth logic elements which receive an output value of the first to the fourth de-multiplexers according to an output port number and output "1" if one of input signals is "1"; and first to sixth decoders which receive output values of the thirty-fourth to the thirty-ninth logic elements as input values and transfer a header storage completion signal and a payload storage completion signal, indicating that the data flit is stored in the buffer according to a header storage request signal and a payload storage request signal inputted from the data input unit according to the output port number, to the data input unit.

24. The asynchronous switch of claim 1, wherein the asynchronous switch further comprises a first delay signal for delaying the header flit process request signal for predetermined time, which is connected between the data input unit and the output port arbitration unit.

25. The asynchronous switch of claim 1, the asynchronous switch further comprises a second delay signal for delaying the header storage request signal for predetermined time, which is connected between the data input unit and the data output unit.

* * * * *